United States Patent
Isomura et al.

(10) Patent No.: US 9,103,432 B2
(45) Date of Patent: Aug. 11, 2015

(54) LUBRICATING OIL SUPPLY DEVICE OF POWER TRANSMISSION DEVICE

(75) Inventors: Haruo Isomura, Susono (JP); Hiroyuki Shioiri, Numazu (JP); Kensuke Akimoto, Suntou-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 161 days.

(21) Appl. No.: 14/112,466

(22) PCT Filed: Apr. 20, 2011

(86) PCT No.: PCT/JP2011/059742
§ 371 (c)(1),
(2), (4) Date: Oct. 17, 2013

(87) PCT Pub. No.: WO2012/144035
PCT Pub. Date: Oct. 26, 2012

(65) Prior Publication Data
US 2014/0054114 A1    Feb. 27, 2014

(51) Int. Cl.
F16H 57/04    (2010.01)

(52) U.S. Cl.
CPC .......... *F16H 57/0427* (2013.01); *F16H 57/045* (2013.01); *F16H 57/0423* (2013.01); *F16H 57/0434* (2013.01); *F16H 57/0457* (2013.01); *F16H 57/0494* (2013.01)

(58) Field of Classification Search
CPC .. F16H 57/04; F16H 57/0427; F16H 57/0434
USPC ...................................... 184/6.12
See application file for complete search history.

(56) References Cited

U.S. PATENT DOCUMENTS

| | | | | |
|---|---|---|---|---|
| 4,612,818 | A * | 9/1986 | Hori et al. | 74/467 |
| 4,630,711 | A * | 12/1986 | Levrai et al. | 184/6.12 |
| 6,634,459 | B1 * | 10/2003 | Litkenhus et al. | 184/6.12 |
| 8,672,094 | B2 * | 3/2014 | Quehenberger | 184/6.12 |

(Continued)

FOREIGN PATENT DOCUMENTS

| | | |
|---|---|---|
| JP | S60-043762 U | 3/1985 |
| JP | S61-114156 U | 7/1986 |

(Continued)

OTHER PUBLICATIONS

Communication dated Feb. 18, 2014, issued by the Japanese Patent Office in corresponding Application No. 2013-510780.

*Primary Examiner* — William E Dondero
*Assistant Examiner* — Mark K Buse
(74) *Attorney, Agent, or Firm* — Sughrue Mion, PLLC

(57) ABSTRACT

A lubricating oil supply device of a power transmission device includes: a storage portion configured to store lubricating oil; a first rotary member configured to be connected to a wheel of a vehicle and rotated in conjunction with a rotation of the wheel to send the lubricating oil of the storage portion; a second rotary member configured to be disposed above the first rotary member in a vertical direction and connected to the wheel; an oil receiving portion configured to be disposed above the first rotary member and the second rotary member in the vertical direction; a first passage configured to guide the lubricating oil, which is sent by the rotation of the first rotary member, to the oil receiving portion; and a second passage configured to guide the lubricating oil, which is sent by the rotation of the first rotary member, to the second rotary member.

8 Claims, 20 Drawing Sheets

(56) References Cited

U.S. PATENT DOCUMENTS

| | | | |
|---|---|---|---|
| 8,931,596 B2 * | 1/2015 | Shioiri et al. | 184/6.12 |
| 2005/0215389 A1 | 9/2005 | Shimizu et al. | |
| 2009/0105035 A1 | 4/2009 | Shimizu et al. | |
| 2010/0319486 A1 | 12/2010 | Kawamoto et al. | |
| 2011/0192245 A1 * | 8/2011 | Shioiri et al. | 74/467 |

FOREIGN PATENT DOCUMENTS

| | | |
|---|---|---|
| JP | 2-121659 U | 10/1990 |
| JP | 2003-214532 A | 7/2003 |
| JP | 2003-336729 A | 11/2003 |
| JP | 2005-024072 A | 1/2005 |
| JP | 2010002026 A | 1/2010 |
| JP | 2010-139052 A | 6/2010 |
| JP | 2010-242783 A | 10/2010 |
| JP | 2011-7210 A | 1/2011 |
| JP | 2011163365 A | 8/2011 |
| WO | 2011096065 A1 | 8/2011 |

* cited by examiner

A-A CROSS-SECTION

AXIAL DIRECTION
LEFT SIDE OF VEHICLE ↔ RIGHT SIDE OF VEHICLE

B-B CROSS-SECTION

AXIAL DIRECTION
LEFT SIDE OF VEHICLE ⟵⟶ RIGHT SIDE OF VEHICLE

AXIAL DIRECTION
LEFT SIDE OF VEHICLE ←→ RIGHT SIDE OF VEHICLE

FIG.12

MG1·2CHARACTERISTICS

|  | ARRANGEMENT POSITION | CHARACTERISTICS ABOUT COOLING |
|---|---|---|
| MG1 | LOW | NEED COOLING WHEN VEHICLE SPEED IS HIGH |
| MG2 | HIGH | NEED COOLING WHEN VEHICLE SPEED IS LOW |

C-C CROSS-SECTION

LEFT SIDE OF VEHICLE ←— AXIAL DIRECTION —→ RIGHT SIDE OF VEHICLE

LUBRICATING OIL SUPPLY DEVICE OF POWER TRANSMISSION DEVICE

CROSS REFERENCE TO RELATED APPLICATIONS

This application is a National Stage of International Application No. PCT/JP2011/059742, filed on Apr.20 , 2011, the contents of all of which are incorporated herein by reference in their entirety.

FIELD

The present invention relates to a lubricating oil supply device of a power transmission device.

BACKGROUND

Conventionally, a technology for supplying lubricating oil to an oil receiving portion by a rotary member such as a gear has been well known. For example, Patent Literature 1 discloses a technology of a lubricating device supplying lubricating oil, which is transported by the rotation of a first rotating body, to a portion requiring lubricating oil. The lubricating device includes a second rotating body that holds the lubricating oil transported by the first rotating body and transports the lubricating oil to a portion requiring lubricating oil by the rotation.

CITATION LIST

Patent Literature

Patent Literature 1: Japanese Patent Application Laid-open No. 2003-214532

SUMMARY

Technical Problem

There is still room for improvement in terms of supply capacity when lubricating oil sent by the rotation of the rotary member is supplied to the oil receiving portion. For example, it is preferable that lubricating oil be appropriately supplied to the oil receiving portion even when the rotational speed of the rotary member is changed according to vehicle speed.

An object of the present invention is to provide a lubricating oil supply device of a power transmission device that can improve the supply capacity for supplying lubricating oil, which is sent by the rotation of a rotary member, to an oil receiving portion.

Solution to Problem

A lubricating oil supply device of a power transmission device according to the present invention includes a storage portion configured to store lubricating oil; a first rotary member configured to be connected to a wheel of a vehicle and rotated in conjunction with a rotation of the wheel to send the lubricating oil of the storage portion; a second rotary member configured to be disposed above the first rotary member in a vertical direction and connected to the wheel; an oil receiving portion configured to be disposed above the first rotary member and the second rotary member in the vertical direction; a first passage configured to include an outlet facing an outer peripheral surface of the second rotary member and guide the lubricating oil, which is sent by the rotation of the first rotary member, to the oil receiving portion; and a second passage configured to guide the lubricating oil, which is sent by the rotation of the first rotary member, to the second rotary member, wherein the second rotary member is rotated in conjunction with the rotation of the wheel to send the lubricating oil, which is sent through the second passage, to the upper side in the vertical direction.

In the lubricating oil supply device of a power transmission device, it is preferable to further include a guide portion configured to guide the lubricating oil, which is sent by the second rotary member, to the oil receiving portion.

In the lubricating oil supply device of a power transmission device, it is preferable to further include an outer peripheral flow passage configured to extend along an outer periphery of the first rotary member and guide the lubricating oil, which is sent by the rotation of the first rotary member, to the upper side in the vertical direction, wherein the first passage and the second passage are preferably connected to the outer peripheral flow passage, respectively, and a second inlet that is an inlet to the second passage from the outer peripheral flow passage is preferably positioned on the outer peripheral flow passage on the downstream side of a first inlet that is an inlet to the first passage from the outer peripheral flow passage, in a flow direction of lubricating oil.

In the lubricating oil supply device of a power transmission device, it is preferable that the cross-sectional area of the outer peripheral flow passage on the downstream side of the second inlet in the flow direction is smaller than the cross-sectional area of the outer peripheral flow passage on the upstream side of the second inlet in the flow direction.

In the lubricating oil supply device of a power transmission device, it is preferable that the cross-sectional area of the outer peripheral flow passage between the first inlet and the second inlet is smaller than the cross-sectional area of the outer peripheral flow passage on the upstream side of the first inlet in the flow direction.

In the lubricating oil supply device of a power transmission device, it is preferable to further include a third rotary member configured to mesh with the first rotary member; and a passage member configured to cover an outer periphery of the first rotary member and an outer periphery of the third rotary member, wherein the passage member preferably forms an outer peripheral flow passage between the outer periphery of the first rotary member and the passage member, the outer peripheral flow passage guides the lubricating oil sent by the rotation of the first rotary member to the upper side in the vertical direction, the first passage and the second passage are preferably connected to the outer peripheral flow passage on the upstream side of the third rotary member in the flow direction of lubricating oil, and the passage member preferably integrally covers the entire outer periphery of the third rotary member, which includes a meshing range meshing with the first rotary member, and the outer periphery of the first rotary member.

In the lubricating oil supply device of a power transmission device, it is preferable to further include a third rotary member configured to mesh with the first rotary member; and a guide member configured to face the outer peripheral surface of the third rotary member and guide lubricating oil sent by the rotation of the third rotary member to the upper side in the vertical direction.

In the lubricating oil supply device of a power transmission device, it is preferable to further include a third rotary member configured to mesh with the first rotary member; and a passage member configured to integrally cover an outer periphery of the first rotary member, an outer periphery of the third rotary member, and a meshing portion between the first rotary member and the third rotary member, wherein the passage member preferably forms an outer peripheral flow passage between the outer periphery of the first rotary member and the passage member, the outer peripheral flow passage guides the lubricating oil sent by the rotation of the first rotary member to the upper side in the vertical direction, the first passage and the second passage are preferably connected to the outer peripheral flow passage on the upstream side of the meshing portion in the flow direction of lubricating oil, the passage member preferably further forms a guide passage between the outer periphery of the third rotary member and the passage member, and the guide passage preferably guides lubricating oil, which falls from the upper side in the vertical direction, to the meshing portion.

In the lubricating oil supply device of a power transmission device, it is preferable that the oil receiving portion includes a first oil receiving portion connected to a portion to be lubricated and to which lubricating oil needs to be supplied at the time vehicle speed is low, and a second oil receiving portion connected to a portion to be lubricated and to which lubricating oil needs to be supplied at the time vehicle speed is high, the first passage preferably guides the lubricating oil, which is sent by the rotation of the first rotary member, to the second oil receiving portion, and the guide portion preferably guides the lubricating oil, which is sent by the second rotary member, to the first oil receiving portion.

Advantageous Effects of Invention

The lubricating oil supply device of a power transmission device according to the present invention includes a first rotary member that is rotated in conjunction with the rotation of a wheel to send lubricating oil of a storage portion, a second rotary member that is disposed above the first rotary member in a vertical direction and is connected to the wheel, an oil receiving portion that is disposed above the first and second rotary members in the vertical direction, a first passage that guides the lubricating oil, which is sent by the rotation of the first rotary member, to the oil receiving portion, and a second passage that includes an outlet facing an outer peripheral surface of the second rotary member and guides the lubricating oil, which is sent by the rotation of the first rotary member, to the second rotary member. The second rotary member is rotated in conjunction with the rotation of the wheel to send the lubricating oil, which is sent through the second passage, to the upper side in the vertical direction. Thus, according to the lubricating oil supply device of a power transmission device of the present invention, an effect capable of improving the supply capacity for supplying lubricating oil, which is sent by the rotation of the rotary member, to the oil receiving portion is obtained.

BRIEF DESCRIPTION OF DRAWINGS

FIG. 12 is a diagram illustrating the characteristics of respective motor generators.

DESCRIPTION OF EMBODIMENTS

Lubricating oil supply devices of power transmission devices according to embodiments of the present invention will be described in detail below with reference to the drawings. Meanwhile, the present invention is not limited by the embodiments. Further, components of the following embodiments include components that can be easily supposed by those skilled in the art or substantially the same components.

[First Embodiment]

Figure 1:
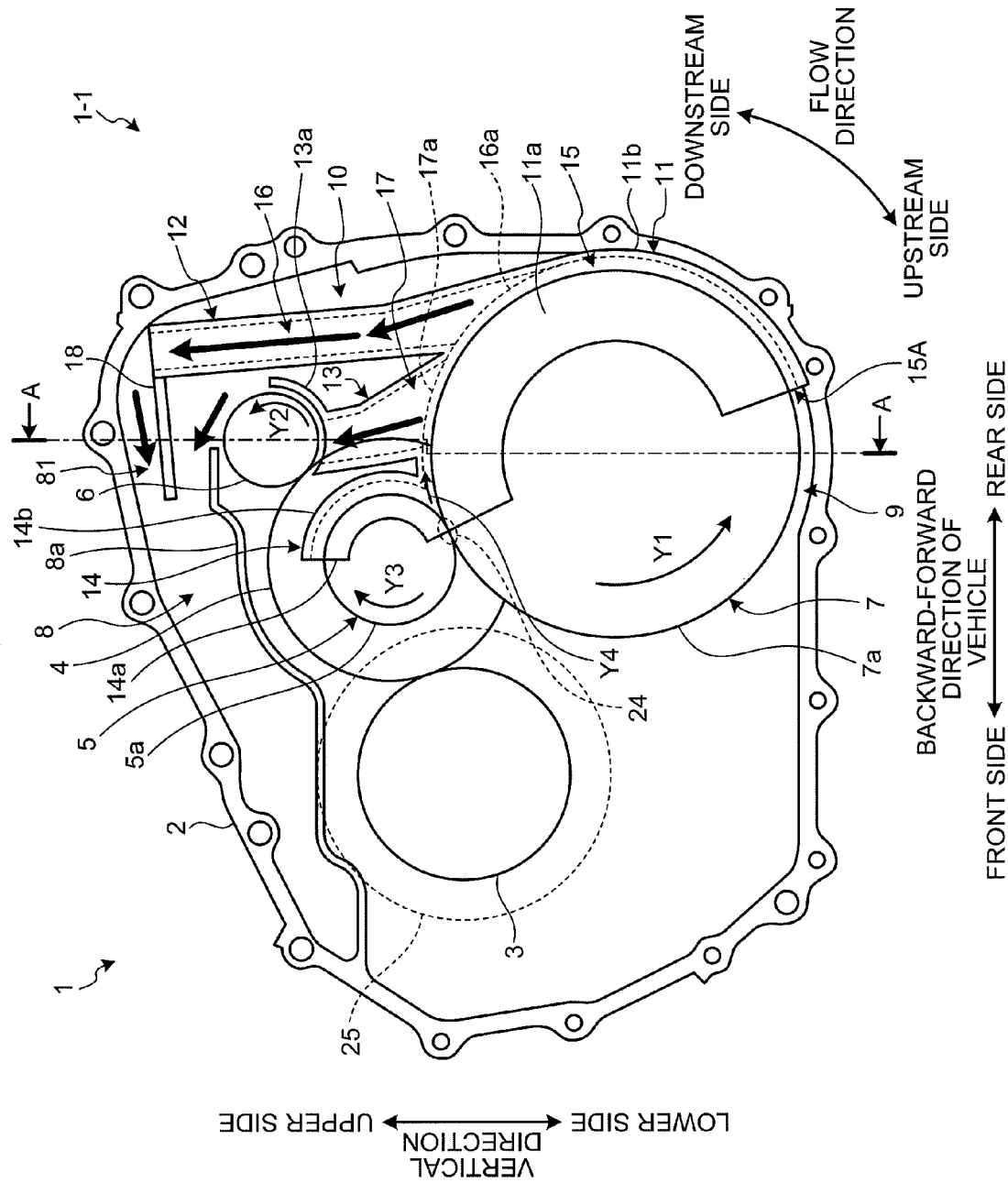
FIG. 1 is a front view illustrating the schematic structure of a power transmission device according to a first embodiment.
Figure 2:
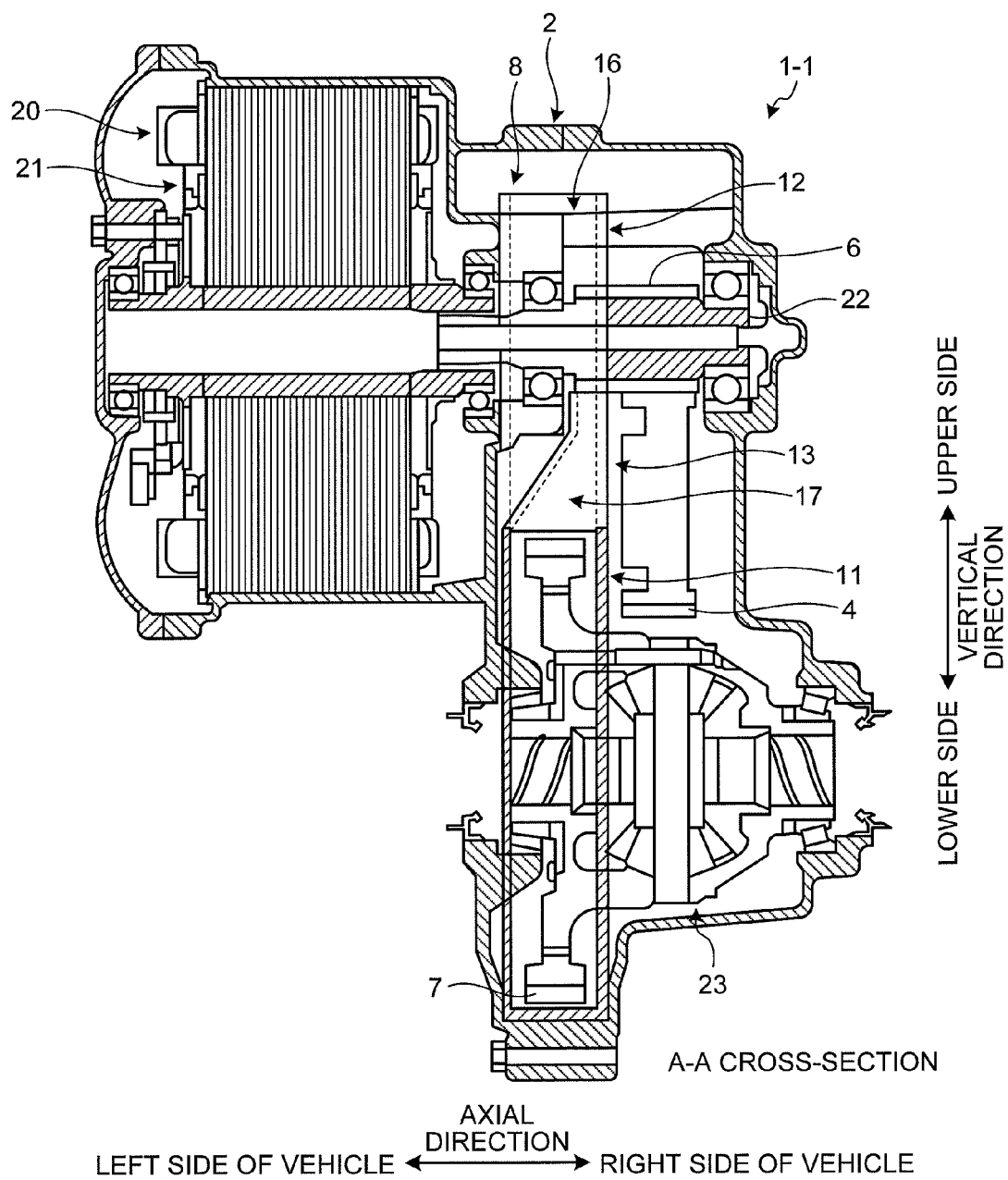
FIG. 2 is a cross-sectional view of the power transmission device according to a first embodiment.
Figure 3:
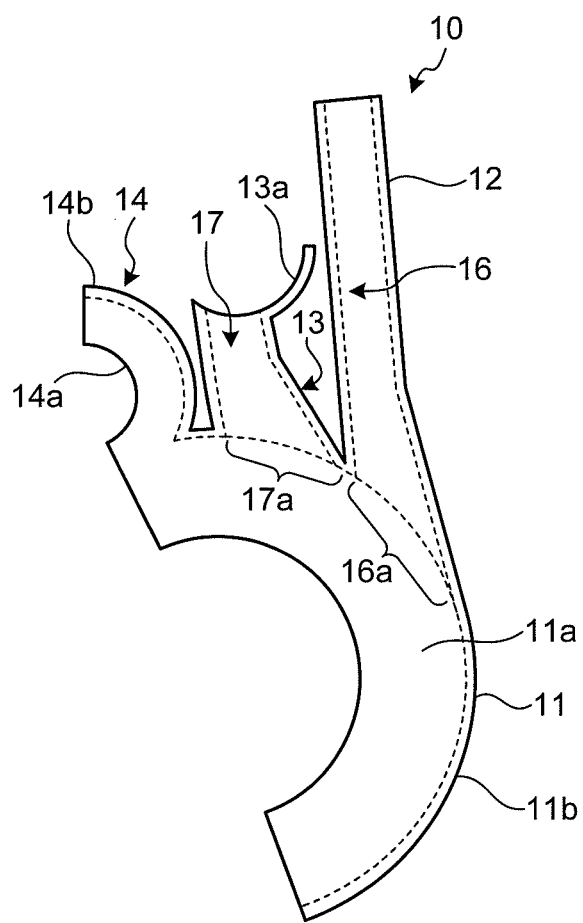
FIG. 3 is a front view of a passage member according to the first embodiment.
Figure 4:
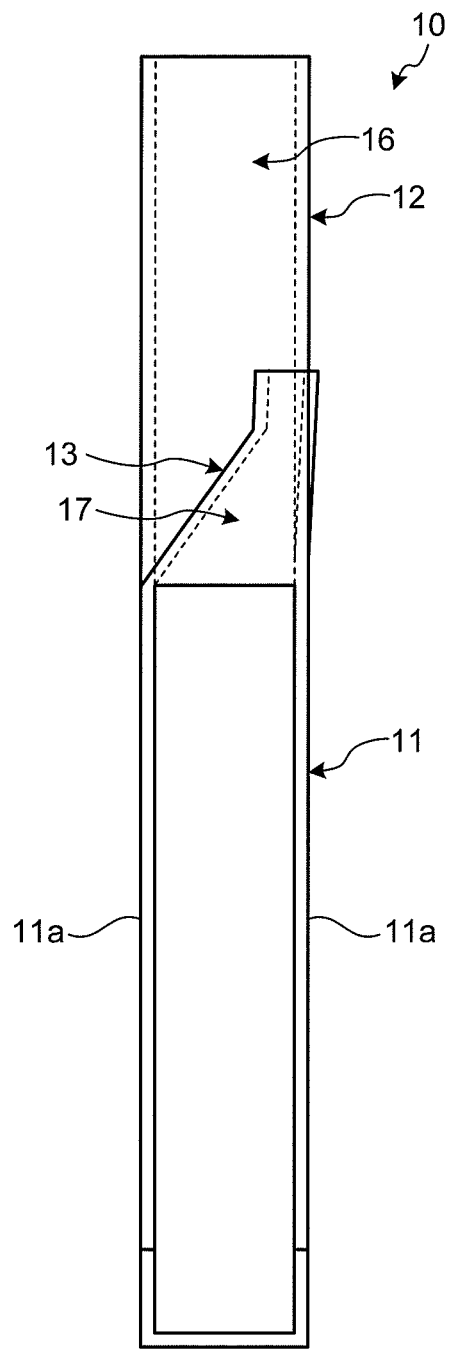
FIG. 4 is a side view of the passage member according to the first embodiment.

A first embodiment will be described with reference to FIGS. 1 to 6. This embodiment relates to a lubricating oil supply device of a power transmission device. FIG. 1 is a front view illustrating the schematic structure of a power transmission device according to the first embodiment, FIG. 2 is a cross-sectional view of the power transmission device according to the first embodiment, FIG. 3 is a front view of a passage member according to the first embodiment, and FIG. 4 is a side view of the passage member according to the first embodiment.

A lubricating oil supply device 1-1 of the power transmission device of this embodiment includes two structures guiding lubricating oil, which is sent by the rotation of a differential ring gear (see reference sign 7 of FIG. 1), to an oil receiving portion (see reference sign 8 of FIG. 1). A first passage (see reference sign 16 of FIG. 1) is a passage that directly guides the lubricating oil, which is sent by the rotation of the differential ring gear 7, to the oil receiving portion 8. The first passage 16 has characteristics in which the lubricating oil does not reach a high position at the time of low vehicle speed but a large amount of lubricating oil can be guided at the time of high vehicle speed. A second passage (see reference sign 17 of FIG. 1) guides the lubricating oil, which is sent by the rotation of the differential ring gear 7, to an MG2 reduction gear (see reference sign 6 of FIG. 1). The lubricating oil, which is guided to the MG2 reduction gear 6, is guided to the oil receiving portion 8 by the rotation of the MG2 reduction gear 6. The second passage 17 and the MG2 reduction gear 6 have characteristics in which the lubricating oil can be guided to a high position when vehicle speed is low.

Accordingly, the lubricating oil supply device 1-1 of the power transmission device of this embodiment can appropriately supply the lubricating oil to the oil receiving portion 8 regardless of vehicle speed. For example, it is possible to supply the lubricating oil to the oil receiving portion 8 according to vehicle speed without excess and deficiency.

This embodiment is based on the assumption that the following components are provided.
(1) Transmission case
(2) ATF
(3) Differential gear
(4) Drive pinion gear
(5) Scraper gear (the MG2 reduction gear in this embodiment)
(6) Duct (the passage member in this embodiment)

In FIG. 1, reference sign 1 denotes a power transmission device of a hybrid vehicle (not illustrated). Further, reference sign 1-1 denotes the lubricating oil supply device of the power transmission device of this embodiment (hereinafter, also simply referred to as a "lubricating oil supply device"). The power transmission device 1 includes a case 2. A counter drive gear 3, a counter driven gear 4, a drive pinion gear (third rotary member) 5, an MG2 reduction gear (second rotary member) 6, the differential ring gear (first rotary member) 7, an oil receiving portion 8, a storage portion 9, and a passage member 10 are provided in the case 2. The lubricating oil supply device 1-1 of the power transmission device of this embodiment includes the storage portion 9, the differential ring gear 7, the oil receiving portion 8, the first passage 16, and the second passage 17.

The counter drive gear 3 is disposed on the front side of the counter driven gear 4 in the backward-forward direction of the vehicle, and the MG2 reduction gear 6 and the differential ring gear 7 are disposed on the rear side of the counter driven gear 4 in the backward-forward direction of the vehicle.

The counter drive gear 3 is connected to an output shaft of an engine (not illustrated) and a rotating shaft of a first motor generator (MG1) 25 through a planetary gear mechanism, and the output of the engine is divided and input to the counter drive gear 3 and the first motor generator 25. The counter driven gear 4 and the drive pinion gear 5 are coaxially disposed and integrally rotated. The counter driven gear 4 meshes with the counter drive gear 3. The MG2 reduction gear 6 is connected to a rotating shaft 22 of a rotor 21 of a second motor generator (MG2) 20, and is rotated integrally with the rotor 21.

The first motor generator 25 and the second motor generator 20 have both a function as a motor that is driven by the supply of electric power (powering function) and a function as a generator that converts mechanical energy into electrical energy (regenerative function). For example, an AC synchronous motor generator can be used as the motor generators 20 and 25. The first motor generator 25 mainly functions as, for example, a generator and recovers the power of the engine or the kinetic energy of the hybrid vehicle as electric power. The second motor generator 20 mainly functions as, for example, a motor and can output power as a power source of the hybrid vehicle.

The MG2 reduction gear 6 meshes with the counter driven gear 4. Since the diameter of the MG2 reduction gear 6 is smaller than the diameter of the counter driven gear 4, the output of the second motor generator 20 is amplified and transmitted to the counter driven gear 4 from the MG2 reduction gear 6.

The drive pinion gear 5 meshes with the differential ring gear 7, and the output torque of the second motor generator 20 and the output torque of the engine input to the counter driven gear 4 are transmitted to the differential ring gear 7 through the drive pinion gear 5. The differential ring gear 7 is connected to a drive wheel (not illustrated) through a differential mechanism 23, and is rotated in conjunction with the rotation of the drive wheel. An arrow Y1 represents the rotation direction of the differential ring gear 7 when the vehicle moves forward. The MG2 reduction gear 6 is disposed above the differential ring gear 7 in a vertical direction.

The storage portion 9, which stores lubricating oil (for example, ATF), is formed at a lower portion of the case 2 in the vertical direction. The differential ring gear 7 is disposed at a lower portion of the case 2.

Accordingly, when lubricating oil is stored in the storage portion 9, a part of the differential ring gear 7 is immersed in the lubricating oil. The oil receiving portion 8 is provided above the MG2 reduction gear 6 and the differential ring gear 7 in the case 2 in the vertical direction.

The oil receiving portion 8 is configured to be capable of storing lubricating oil, and the lubricating oil having flowed into the oil receiving portion 8 is supplied to a portion to be lubricated of the power transmission device 1. Meanwhile, the oil receiving portion 8 may directly supply the lubricating oil, which has been received, to the portion to be lubricated without storing the lubricating oil. The oil receiving portion 8 is partitioned from a lower space of the case 2 by a rib 8a that protrudes from the inner wall surface of the case 2. The lubricating oil of the oil receiving portion 8 is supplied to, for example, the first and second motor generators 25 and 20 and lubricates and cools the first motor generator 25 and the second motor generator 20. Meanwhile, the lubricating oil of the oil receiving portion 8 may be supplied to other portions to be lubricated of the power transmission device 1.

The differential ring gear 7 is rotated in conjunction with the rotation of the drive wheel to send the lubricating oil of the storage portion 9. A technology for scraping the lubricating oil of the storage portion toward a supply destination such as the oil receiving portion, which is provided at the upper portion in the vertical direction, by a rotary member such as the differential ring gear 7 has been known in the past. However, such a scraping method has had a problem in that lubricating oil does not reach a supply destination or a sufficient amount of lubricating oil is not supplied to a supply destination in the following situations.

(a) When vehicle speed is low (since the rotational speed of the differential ring gear is low).

(b) A supply destination is high when seen from the differential gear shaft (since a momentum of lubricating oil is not sufficient in terms of a height).

(c) A supply destination is positioned closer to the rear portion of the vehicle than the differential ring gear (since it is difficult to direct the splashing direction of lubricating oil to a target).

(d) When a vehicle travels up a hill (since the amount of lubricating oil present around the differential ring gear is increased and a momentum of lubricating oil to be splashed is removed).

The lubricating oil supply device 1-1 of this embodiment includes the passage member 10 guiding the lubricating oil, which is sent by the differential ring gear 7, to the oil receiving portion 8. Accordingly, even though vehicle speed is low or even though the oil receiving portion 8 is high when seen from a rotating shaft of the differential ring gear 7, it is possible to supply the lubricating oil to the oil receiving portion 8.

The passage member 10 includes a first component part 11, a second component part 12, a third component part 13, and a fourth component part 14. The first component part 11 forms an outer peripheral flow passage 15 between the outer periphery of the differential ring gear 7 and itself. The outer peripheral flow passage 15 is a flow passage that extends along the outer periphery of the differential ring gear 7 and guides the lubricating oil, which is sent by the rotation of the differential ring gear 7, to the upper side in the vertical direction. In this specification, the flow direction of the lubricating oil, which flows in the outer peripheral flow passage 15 along the rotation direction (Y1) of the differential ring gear 7, is simply referred to as the "flow direction of the outer peripheral flow passage 15". Further, the upstream side and downstream side of the outer peripheral flow passage 15 in the flow direction, when the hybrid vehicle moves forward, are simply referred to as the "upstream side of the outer peripheral flow passage 15" and the "downstream side of the outer peripheral flow passage 15", respectively.

The first component part 11 includes a pair of side wall portions 11a that face each other in the axial direction with the differential ring gear 7 interposed therebetween, and a curved surface portion 11b that faces an outer peripheral surface 7a of the differential ring gear 7 in a radial direction and is formed in the shape corresponding to the outer peripheral surface 7a. Meanwhile, when not particularly described in this specification, the "axial direction" means the axial direction of the differential ring gear 7, the "radial direction" means the radial direction orthogonal to the central axis of the differential ring gear 7, and the "circumferential direction" means a circumferential direction of which the center of rotation is positioned on the central axis of the differential ring gear 7.

The curved surface portion 11b is disposed concentrically with the differential ring gear 7. Outer end portions of the side wall portions 11a and 11a in the radial direction are connected to each other by the curved surface portion 11b. That is, the first component part 11 faces each of both side surfaces and the outer peripheral surface 7a of the differential ring gear 7, and the outer peripheral flow passage 15 as a lubricating oil passage is formed between the first component part 11 and the differential ring gear 7. The outer peripheral flow passage 15 is an oil passage which extends along the outer periphery of the differential ring gear 7 and into which the lubricating oil sent by the differential ring gear 7 flows.

An area in which the first component part 11 is installed in the circumferential direction of the differential ring gear 7 is slightly larger than the half periphery of the differential ring gear 7, and the front tooth surface of the differential ring gear 7 in the rotation direction corresponds to an area that faces the upper side in the vertical direction. In other words, a range of the differential ring gear 7 in the circumferential direction along which the outer peripheral flow passage 15 is formed corresponds to a range in which the lubricating oil is sent to the upper side in the vertical direction by the rotation of the differential ring gear 7. Accordingly, an inlet 15A for lubricating oil of the outer peripheral flow passage 15 is positioned near the lower end of the outer peripheral flow passage 15 in the vertical direction. Further, a downstream end of the outer peripheral flow passage 15 in the flow direction of lubricating oil along the rotation direction of the differential ring gear 7 is positioned near the upper end of the differential ring gear 7 in the vertical direction. Since the outer peripheral surface of the curved surface portion 11b is close to the bottom of the case 2 at the inlet 15A, the lubricating oil sent by the rotation of the differential ring gear 7 flows into the outer peripheral flow passage 15 from the inlet 15A.

When the differential ring gear 7 is rotated, the lubricating oil of the storage portion 9 is sent to the differential ring gear 7 and flows into the outer peripheral flow passage 15 from the inlet 15A. Since lubricating oil is continuously sent to the outer peripheral flow passage 15 by the differential ring gear 7, oil pressure in the outer peripheral flow passage 15 rises. That is, the outer peripheral flow passage 15 functions as an oil concentrating portion that increases the pressure of lubricating oil by collecting the lubricating oil present around the differential ring gear 7. When oil pressure in the outer peripheral flow passage 15 rises, the lubricating oil present in the outer peripheral flow passage 15 rises upward along the first and second passages 16 and 17 to be described below. That is, the differential ring gear 7 and the passage member 10 function as a pump that increases the pressure of lubricating oil and sends the lubricating oil to the upper side.

Accordingly, the lubricating oil supply device 1-1 of the power transmission device of this embodiment can send lubricating oil to the upper side in the vertical direction by pressure even though vehicle speed is low. Further, it is possible to send lubricating oil in a desired direction regardless of the splashing direction of the lubricating oil sent from the differential ring gear 7.

The first passage 16 and the second passage 17 are connected to the outer peripheral flow passage 15. All of the first passage 16 and the second passage 17 are connected to the outer peripheral flow passage 15 on the upstream side of the drive pinion gear 5 in the flow direction of the outer peripheral flow passage 15. The first passage 16 is a passage that guides the lubricating oil, which is sent by the rotation of the differential ring gear 7, to the oil receiving portion 8 from the outer peripheral flow passage 15. The first passage 16 is branched from the outer peripheral flow passage 15 to the outside in the radial direction and extends toward an inlet 81 of the oil receiving portion 8. Further, the second passage 17 guides the lubricating oil, which is sent by the rotation of the differential ring gear 7, to the MG2 reduction gear 6 as the second rotary member. The second passage 17 is branched from the outer peripheral flow passage 15 to the outside in the radial direction and extends toward the MG2 reduction gear 6.

The first passage 16 is formed in the second component part 12. The second component part 12 extends linearly toward the oil receiving portion 8 from the outer peripheral portion of the first component part 11 in the vertical direction. The second component part 12 is a duct-like member, that is, a chimney-like member. The cross-sectional shape of the second component part 12 can be, for example, a rectangular shape. The first passage 16 passes through the second component part 12 in the vertical direction. The first passage 16 communicates with the outer peripheral flow passage 15 at the lower end thereof, and communicates with the oil receiving portion 8 at the upper end thereof. A plate-like member 18 is disposed at the upper end of the second component part 12. The plate-like member 18 extends toward the oil receiving portion 8 from an edge portion of the upper end of the first passage 16. The plate-like member 18 is gently inclined downward in the vertical direction from the first passage 16 toward the oil receiving portion 8. The lubricating oil, which flows out of the upper end of the first passage 16, is guided to the plate-like member 18 and flows into the oil receiving portion 8.

The second passage 17 is formed in the third component part 13. The third component part 13 extends toward the MG2 reduction gear 6 from the outer peripheral portion of the first component part 11 in the vertical direction. The third component part 13 is a duct-like member. The cross-sectional shape of the third component part 13 can be, for example, a rectangular shape. The second passage 17 passes through the third component part 13 in the vertical direction. The second passage 17 communicates with the outer peripheral flow passage 15 at the lower end thereof, and communicates with the outer peripheral portion of the MG2 reduction gear 6 at the upper end thereof. An outlet, which is the upper end of the second passage 17, faces the outer peripheral surface of the MG2 reduction gear 6. The lubricating oil, which flows out of the second passage 17, flows toward the outer peripheral surface of the MG2 reduction gear 6.

An arrow Y2 indicates the rotation direction of the MG2 reduction gear 6 when the hybrid vehicle moves forward. The MG2 reduction gear 6 is rotated in conjunction with the rotation of the drive wheel of the hybrid vehicle to send the lubricating oil, which is sent through the second passage 17, to the upper side in the vertical direction. The lubricating oil, which is sent to the upper side in the vertical direction by the rotation of the MG2 reduction gear 6, flows into the oil receiving portion 8 through the inlet 81. Since the inlet 81 is formed immediately above the MG2 reduction gear 6, it is possible to efficiently send the lubricating oil to the oil receiving portion by the MG2 reduction gear 6.

The third component part 13 includes a guide portion 13a. The guide portion 13a is provided at the upper end portion of the third component part 13. The guide portion 13a faces the outer peripheral surface of the MG2 reduction gear 6, and extends from an outlet of the second passage 17 in the rotation direction Y2 of the MG2 reduction gear 6 along the outer peripheral surface of the MG2 reduction gear 6. The lubricating oil, which is guided to the MG2 reduction gear 6 through the second passage 17 and is sent by the MG2 reduction gear 6, is guided to the upper side in the vertical direction by the guide portion 13a. The guide portion 13a is provided in an area that is formed between the lower end of the MG2 reduction gear 6 and the middle portion of the MG2 reduction gear 6 in a height direction.

The lubricating oil, which is guided to the upper portion of the MG2 reduction gear 6 by the guide portion 13a, is separated from the MG2 reduction gear 6 and flows into the oil receiving portion 8 through the inlet 81. That is, the guide portion 13a suppresses the falling of the lubricating oil by guarding the lower portion of the MG2 reduction gear 6, and guides the lubricating oil, which is sent by the MG2 reduction gear, to the oil receiving portion 8. Accordingly, the MG2 reduction gear 6 can efficiently send the lubricating oil, which flows out of the second passage 17, to the upper side in the vertical direction and supply the lubricating oil to the oil receiving portion 8.

The lubricating oil supply device 1-1 of this embodiment includes a first route along which the lubricating oil sent by the rotation of the differential ring gear 7 is directly guided to the oil receiving portion 8 through the first passage 16, and a second route along which the lubricating oil sent by the rotation of the differential ring gear 7 is guided to the oil receiving portion 8 through the second passage 17 and the MG2 reduction gear 6. Accordingly, as described with reference to FIG. 5, it is possible to improve the capacity for supplying the lubricating oil, which is sent by the rotation of the differential ring gear 7, to the oil receiving portion 8.

Figure 5:
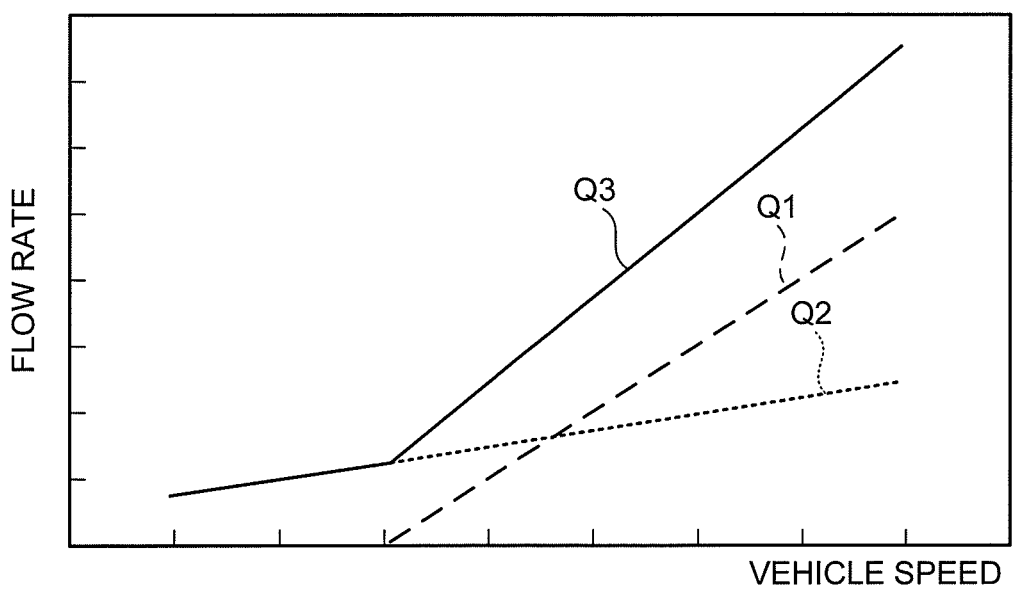
FIG. 5 is an explanatory diagram illustrating the lubricating oil supply capacity of a lubricating oil supply device.

FIG. 5 is an explanatory diagram illustrating the lubricating oil supply capacity of the lubricating oil supply device 1-1 of the power transmission device. In FIG. 5, a horizontal axis represents the speed of the hybrid vehicle and a vertical axis represents the flow rate of the lubricating oil that is sent to the oil receiving portion 8. Reference sign Q1 denotes a flow rate of the lubricating oil that is sent to the oil receiving portion 8 along only the first route, that is, the flow rate of the lubricating oil that is sent to the oil receiving portion 8 through the first passage 16. Reference sign Q2 denotes a flow rate of the lubricating oil that is sent to the oil receiving portion 8 along only the second route, that is, the flow rate of the lubricating oil that is sent to the oil receiving portion 8 through the second passage 17 and the MG2 reduction gear 6. Reference sign Q3 denotes the sum of the flow rate Q1 of the lubricating oil that is sent along the first route and the flow rate Q2 of the lubricating oil that is sent along the second route, that is, the total flow rate of the lubricating oil that is sent to the oil receiving portion 8 by the lubricating oil supply device 1-1.

The rotational speed of the differential ring gear 7 significantly affects the flow rate Q1 of the lubricating oil that is sent along the first route. In the first route, the lubricating oil does not reach a high position at the time of low vehicle speed and the flow rate of the lubricating oil, which can be sent to the oil receiving portion 8, is low. On the other hand, the first route has characteristics in which a large amount of lubricating oil can be sent to the oil receiving portion 8 when vehicle speed is high.

Since the diameter of the MG2 reduction gear 6 is smaller than the diameter of the differential ring gear 7, and the MG2 reduction gear 6 is rotated at a relatively high speed even when vehicle speed is low. Further, since the MG2 reduction gear 6 is disposed above the differential ring gear 7 in the vertical direction, the head to the oil receiving portion 8 is relatively small. Accordingly, the second route along which lubricating oil is sent through the MG2 reduction gear 6 allows the lubricating oil to be guided to a high position in the vertical direction even when vehicle speed is low. On the other hand, the second route has characteristics in which the flow rate Q2 of the lubricating oil, which can be sent, is saturated when vehicle speed is increased. There is a limitation on the amount of lubricating oil that can be scraped off by the MG2 reduction gear 6. Accordingly, the flow rate Q2 of the lubricating oil, which can be guided along the second route when vehicle speed is high, is lower than the flow rate Q1 of the lubricating oil that can be guided by the first route.

The lubricating oil supply device 1-1 of this embodiment can take advantage of the characteristics of the respective first and second routes. When vehicle speed is low, it is possible to supply lubricating oil to the oil receiving portion 8 through the second route. Accordingly, it is possible to appropriately supply lubricating oil to the oil receiving portion 8 from when vehicle speed is low. Further, when vehicle speed is high, it is possible to supply lubricating oil to the oil receiving portion 8 through the first route. Accordingly, even though the flow rate Q2 of the lubricating oil, which is sent to the oil receiving portion 8 through the second route when vehicle speed is high, is saturated, it is possible to supply an appropriate amount of lubricating oil to the oil receiving portion 8 through the first route.

Therefore, the lubricating oil supply device 1-1 of this embodiment has an effect capable of supplying an appropriate amount of lubricating oil to the oil receiving portion 8 according to vehicle speed from low vehicle speed to high vehicle speed. It is also possible to supply lubricating oil to the oil receiving portion 8 according to vehicle speed without excess and deficiency by appropriately setting the cross-sectional areas of the flow passages of the first and second routes or the like.

Further, the first passage 16 and the second passage 17 are disposed in the lubricating oil supply device 1-1 of this embodiment so that lubricating oil is sent through an appropriate route according to vehicle speed as described below. As illustrated in FIG. 1, a second inlet 17a that is an inlet to the second passage 17 from the outer peripheral flow passage 15 is positioned on the outer peripheral flow passage 15 on the downstream side of a first inlet 16a, which is an inlet to the first passage 16 from the outer peripheral flow passage 15, in the flow direction of lubricating oil. The second inlet 17a is positioned above the first inlet 16a in the vertical direction.

Since the rotational speed of the differential ring gear 7 is relatively low when vehicle speed is low, the lubricating oil sent by the rotation of the differential ring gear 7 reaches the upper portion of the outer peripheral flow passage 15 in the vertical direction while adhering to the outer periphery of the differential ring gear 7. Accordingly, when vehicle speed is low, a large amount of lubricating oil flows into the second passage 17. Therefore, it is possible to supply an appropriate amount of lubricating oil to the oil receiving portion 8 through the second route. On the other hand, since the rotational speed of the differential ring gear 7 is high when vehicle speed is high, a large centrifugal force is applied to lubricating oil. Accordingly, a large amount of lubricating oil flows into the first passage 16. That is, when vehicle speed is high, lubricating oil that is more than the lubricating oil flowing into the second route when vehicle speed is low flows into the second route. Accordingly, an appropriate amount of lubricating oil is supplied to the oil receiving portion 8 through the second route.

Therefore, the lubricating oil supply device 1-1 of this embodiment can efficiently send lubricating oil to the oil receiving portion 8 through the second passage 17 by preferentially sending lubricating oil to the second passage 17 when vehicle speed is low, and can supply a large amount of lubricating oil to the oil receiving portion 8 by increasing the amount of lubricating oil flowing into the first passage 16 when vehicle speed is high.

Figure 6:
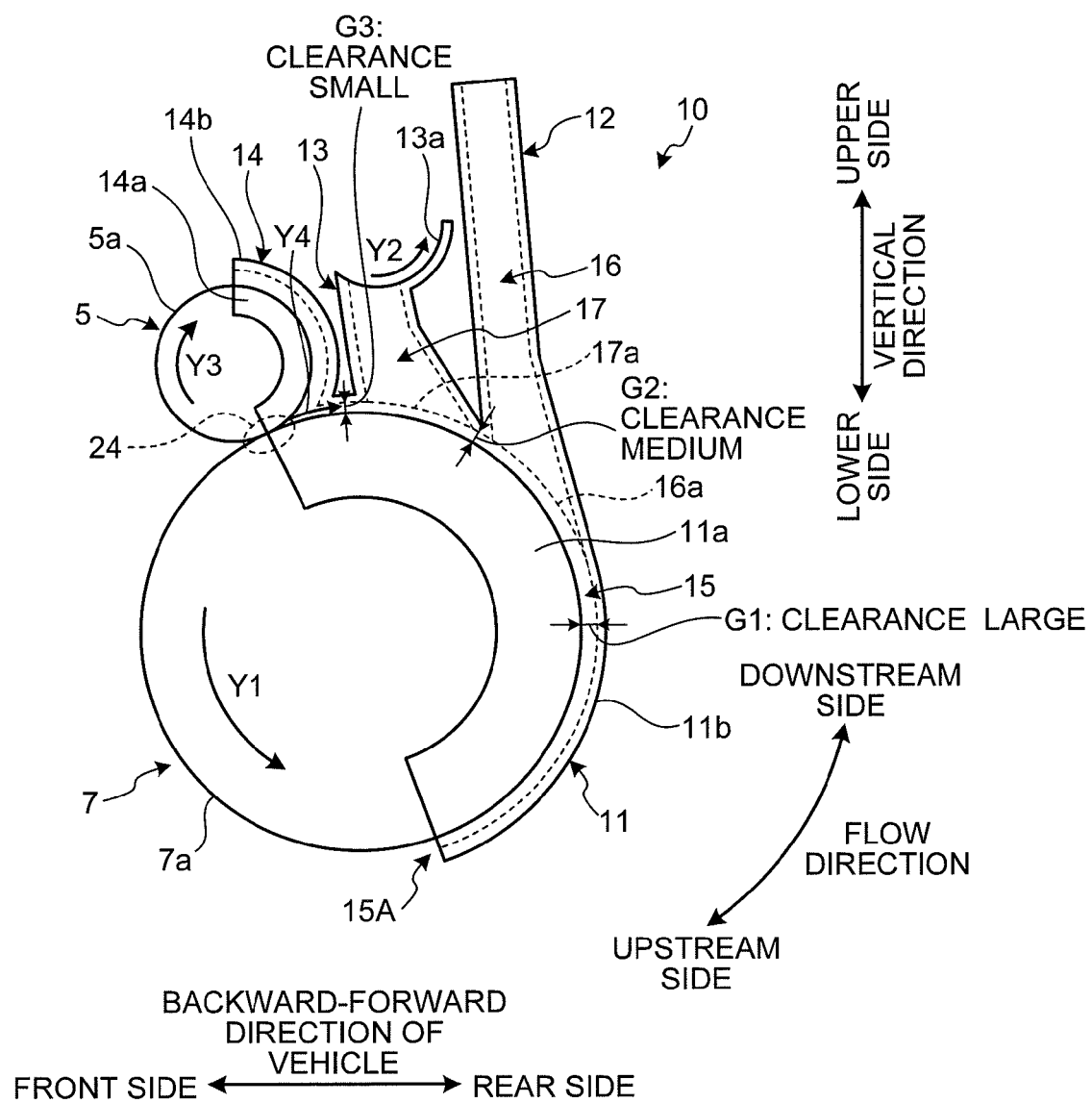
FIG. 6 is an explanatory diagram illustrating the cross-sectional area of an outer peripheral flow passage.

Further, the cross-sectional area of the outer peripheral flow passage 15 is set so that the lubricating oil supply device 1-1 of this embodiment can send lubricating oil to the oil receiving portion 8 through an appropriate route according to vehicle speed. FIG. 6 is an explanatory diagram illustrating the cross-sectional area of the outer peripheral flow passage 15. In this embodiment, the cross-sectional area of the outer peripheral flow passage 15 on the downstream side of the outer peripheral flow passage 15 is smaller than the cross-sectional area of the outer peripheral flow passage 15 on the upstream side of the outer peripheral flow passage 15. As illustrated in FIG. 6, the size of a gap between the passage member 10 and the outer peripheral surface 7a of the differential ring gear 7 in the radial direction, that is, a clearance varies according to the position in the flow direction of the outer peripheral flow passage 15.

Specifically, a clearance G2 at a portion between the first and second inlets 16a and 17a is smaller than a clearance G1 at a portion of the outer peripheral flow passage 15 on the upstream side of the first inlet 16a. Accordingly, the cross-sectional area of the outer peripheral flow passage 15 at a portion of the outer peripheral flow passage 15 on the downstream side of the first inlet 16a is smaller than the cross-sectional area of the outer peripheral flow passage 15 at a portion of the outer peripheral flow passage 15 on the upstream side of the first inlet 16a. Oil pressure at the first inlet 16a rises due to a difference in the cross-sectional area of the outer peripheral flow passage, so that lubricating oil is sent to the first passage 16 from the outer peripheral flow passage 15.

Further, a clearance G3 at a portion of the outer peripheral flow passage 15 on the downstream side of the second inlet 17a is smaller than the clearances G1 and G2 at the portions of the outer peripheral flow passage 15 on the upstream side of the second inlet 17a. Accordingly, the cross-sectional area of the outer peripheral flow passage 15 at a portion of the outer peripheral flow passage 15 on the downstream side of the second inlet 17a is smaller than the cross-sectional area of the outer peripheral flow passage 15 at a portion of the outer peripheral flow passage 15 on the upstream side of the second inlet 17a. Oil pressure at the second inlet 17a rises due to a difference in the cross-sectional area of the outer peripheral flow passage, so that lubricating oil is sent to the second passage 17 from the outer peripheral flow passage 15.

Since the rotational speed of the differential ring gear 7 is low when vehicle speed is low, a large amount of lubricating oil sent to the outer peripheral flow passage 15 reaches the second inlet 17a while adhering to the outer periphery of the differential ring gear 7.

Further, when vehicle speed is low, the amount of oil sent to the outer peripheral flow passage 15 by the differential ring gear 7 is small. Accordingly, it is difficult for the pressure of the outer peripheral flow passage 15 to rise as compared to when vehicle speed is high. However, since the clearance G3 on the downstream side of the second inlet 17a is smaller than the clearance G2 on the upstream side of the second inlet 17a in this embodiment, oil pressure rises and lubricating oil flows into the second passage 17 even when the flow rate in the outer peripheral flow passage 15 is low. Accordingly, when vehicle speed is low, most of the lubricating oil sent to the outer peripheral flow passage 15 by the differential ring gear 7 flows into the second passage 17 through the second inlet 17a. Therefore, when vehicle speed is low, a sufficient amount of lubricating oil is supplied to the oil receiving portion 8 from the outer peripheral flow passage 15 through the second passage 17 and the MG2 reduction gear 6.

Since the rotational speed of the differential ring gear 7 is high when vehicle speed is high, lubricating oil is separated from the differential ring gear 7 by a centrifugal force and flows into the first passage 16. Accordingly, a large amount of lubricating oil is sent to the first passage 16 by the rotational energy of the differential ring gear 7. Further, since a large amount of lubricating oil is sent to the outer peripheral flow passage 15 by the differential ring gear 7 when vehicle speed is high, the pressure of the outer peripheral flow passage 15 is increased as compared to when vehicle speed is low. Accordingly, a large amount of lubricating oil is also sent to the first passage 16 by a pumping action that is caused by the differential ring gear 7. When vehicle speed is high, a sufficient amount of lubricating oil is guided to the oil receiving portion 8 through the second passage 17 and the first passage 16 by these.

According to the lubricating oil supply device 1-1 of this embodiment, lubricating oil is guided to the oil receiving portion 8 through an appropriate route according to vehicle speed in this way. Accordingly, it is possible to supply lubricating oil to the oil receiving portion 8 at an appropriate flow rate regardless of vehicle speed. It is possible to realize the reduction of costs of an oil pump and the reduction of drag torque by improving the capacity for guiding the lubricating oil, which is sent by the rotation of the differential ring gear 7, to the oil receiving portion 8.

Furthermore, in the lubricating oil supply device 1-1 of this embodiment, the capacity for supplying lubricating oil to the oil receiving portion 8 using an oil extruding effect, which is caused by the meshing between the differential ring gear 7 and the drive pinion gear 5, is to be improved.

The fourth component part 14 covers the outer peripheral portion of the drive pinion gear 5 and a meshing portion 24 between the drive pinion gear 5 and the differential ring gear 7. The fourth component part 14 is connected to a downstream end portion of the first component part 11 in the flow direction of the outer peripheral flow passage 15, and protrudes upward from the first component part 11 in the vertical direction.

The fourth component part 14 includes a pair of side wall portions 14a and a curved surface portion 14b. The side wall portions 14a and 14a face each other in an axial direction with the drive pinion gear 5 interposed therebetween. The curved surface portion 14b faces an outer peripheral surface 5a of the drive pinion gear 5 in the radial direction of the drive pinion gear 5, and has a curved surface shape corresponding to the outer peripheral surface 5a. The side wall portion 14a of the fourth component part 14 is formed continuously with the side wall portion 11a so as to be flush with the side wall portion 11a of the first component part 11. Further, the curved surface portion 14b of the fourth component part 14 is connected to the curved surface portion 11b of the first component part 11. That is, the first component part 11 and the fourth component part 14 integrally cover the outer periphery of the differential ring gear 7, the outer periphery of the drive pinion gear 5, and the meshing portion 24. Furthermore, the outer periphery of the differential ring gear 7 covered with the first component part 11 and the outer periphery of the drive pinion gear 5 covered with the fourth component part 14 are engagement-side outer peripheries, respectively.

Meanwhile, the engagement sides mean the rear sides in the rotation directions of the gears 5 and 7 and in the tangential direction of the meshing portion 24 between the differential ring gear 7 and the drive pinion gear 5, and mean the sides on which teeth of the gears 5 and 7 are engaged with each other toward the meshing portion 24 between the gears 5 and 7. That is, the curved surface portions 14b and 11b face the outer peripheral surfaces 5a and 7a that are pulled toward the meshing portion 24, respectively. Meanwhile, an arrow Y3 represents the rotation direction of the drive pinion gear 5 when the hybrid vehicle moves forward.

The lubricating oil adhering to the outer periphery of the differential ring gear 7 and the lubricating oil adhering to the outer periphery of the drive pinion gear 5 are extruded from tooth grooves of the gears 5 and 7 at the meshing portion 24. Accordingly, pressure at the downstream end of the outer peripheral flow passage 15 in the flow direction increased, so that the wall of lubricating oil is formed. Therefore, the flow of lubricating oil from the second inlet 17a toward the downstream side of the outer peripheral flow passage 15 is suppressed. For example, the lubricating oil, which is extruded at the meshing portion 24, flows backward toward the second inlet 17a through the outer peripheral flow passage 15 as illustrated by an arrow Y4, and restricts the flow of lubricating oil along the rotation direction of the differential ring gear 7. Accordingly, the pumping action, which is caused by the rotation of the differential ring gear 7, is improved, so that the supply capacity for sending lubricating oil to the oil receiving portion 8 through the first passage 16 and the second passage 17 is improved.

Meanwhile, in this embodiment, the lubricating oil sent by the rotation of the MG2 reduction gear 6 has been guided to the oil receiving portion 8 by the guide plate-like guide portion 13a. However, instead of this, the lubricating oil sent by the rotation of the MG2 reduction gear 6 may be guided to the oil receiving portion 8 through a duct-like passage.

An object to which the lubricating oil supply device 1-1 of the power transmission device of this embodiment is applied is not limited to a power transmission device of a hybrid vehicle. The lubricating oil supply device 1-1 of the power transmission device may be applied to other kinds of power transmission devices, for example, a power transmission device of an MT (manual transmission).

[Second Embodiment]

A second embodiment will be described with reference to FIGS. 7 to 12. In the second embodiment, components having the same functions as the components described in the above-mentioned embodiment will be denoted by the same reference signs and the repeated description will be omitted. A lubricating oil supply device 1-2 of a power transmission device of this embodiment is different from the lubricating oil supply device 1-1 of the power transmission device of the first embodiment in that the first passage and the second passage guide lubricating oil to oil receiving portions different from each other. The two passages supply lubricating oil to portions, which are to be lubricated and are different from each other, on the lubricating oil supply capacities of the respective passage corresponding to vehicle speed. Accordingly, it is possible to supply an appropriate amount of lubricating oil to a necessary and appropriate portion according to vehicle speed.

Figure 7:
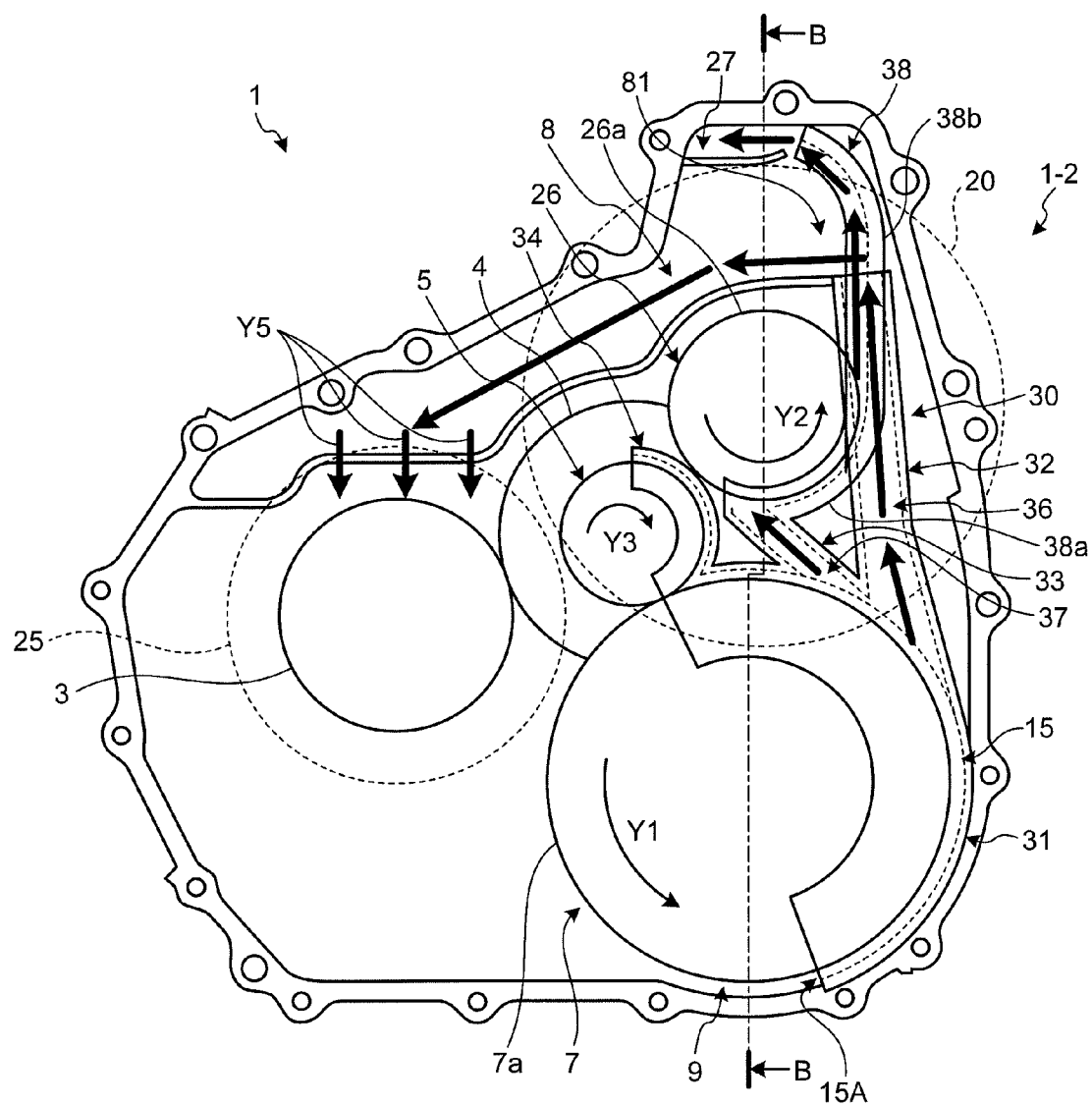
FIG. 7 is a front view illustrating the schematic structure of a power transmission device according to a second embodiment.
Figure 8:
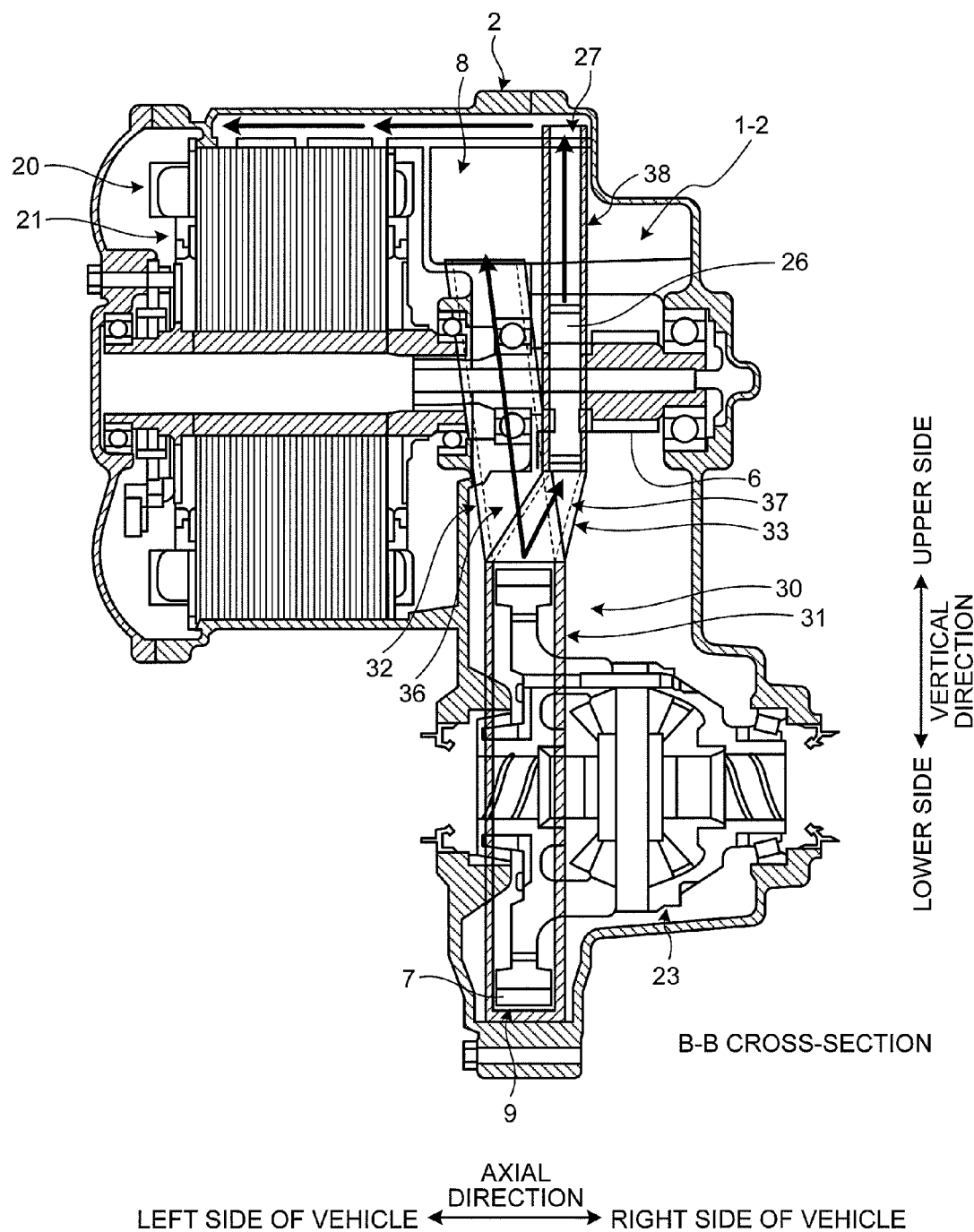
FIG. 8 is a cross-sectional view of the power transmission device according to the second embodiment.
Figure 9:
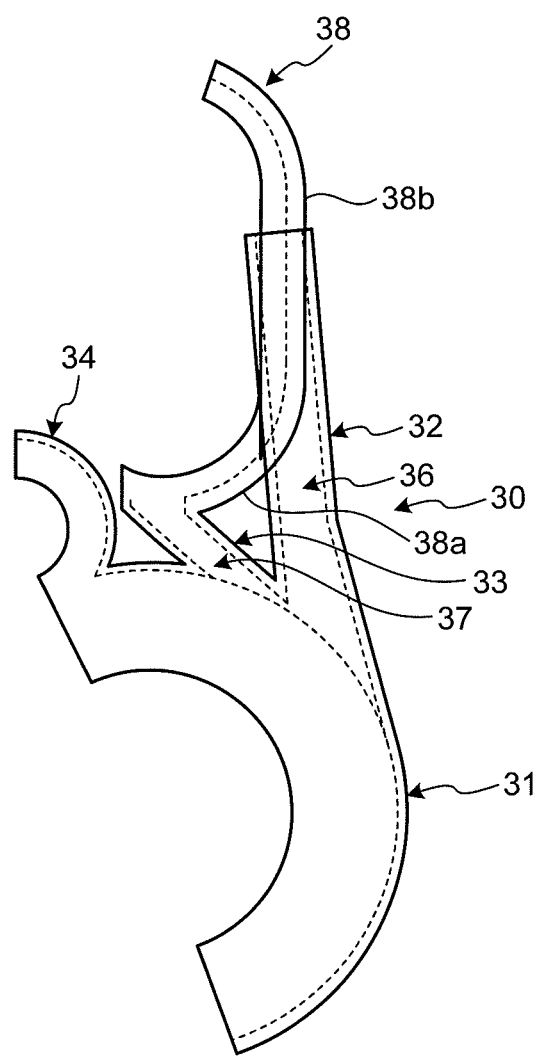
FIG. 9 is a front view of a passage member according to the second embodiment.
Figure 10:
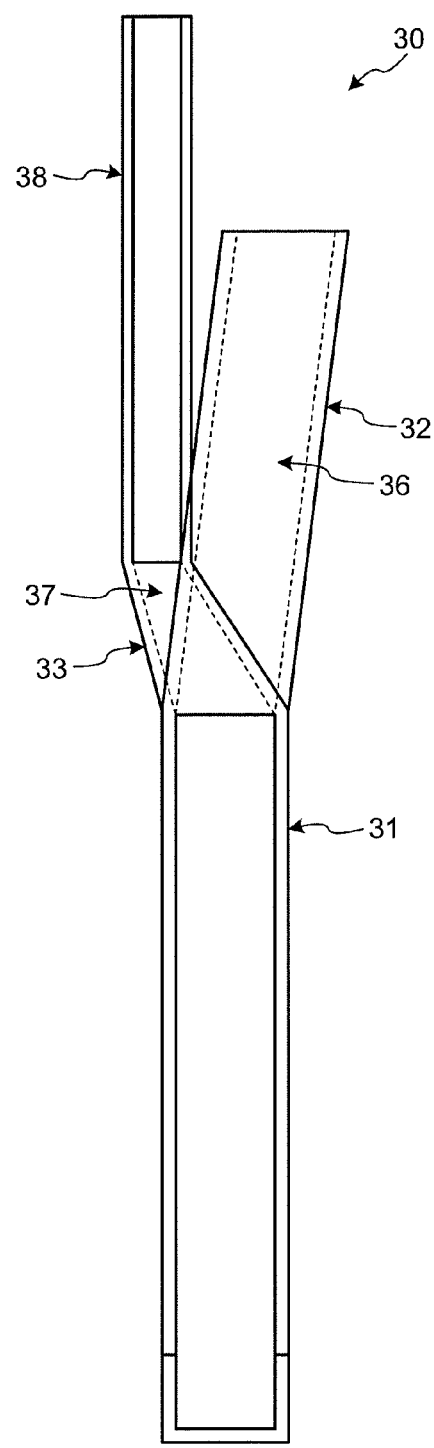
FIG. 10 is a side view of the passage member according to the second embodiment.
Figure 11:
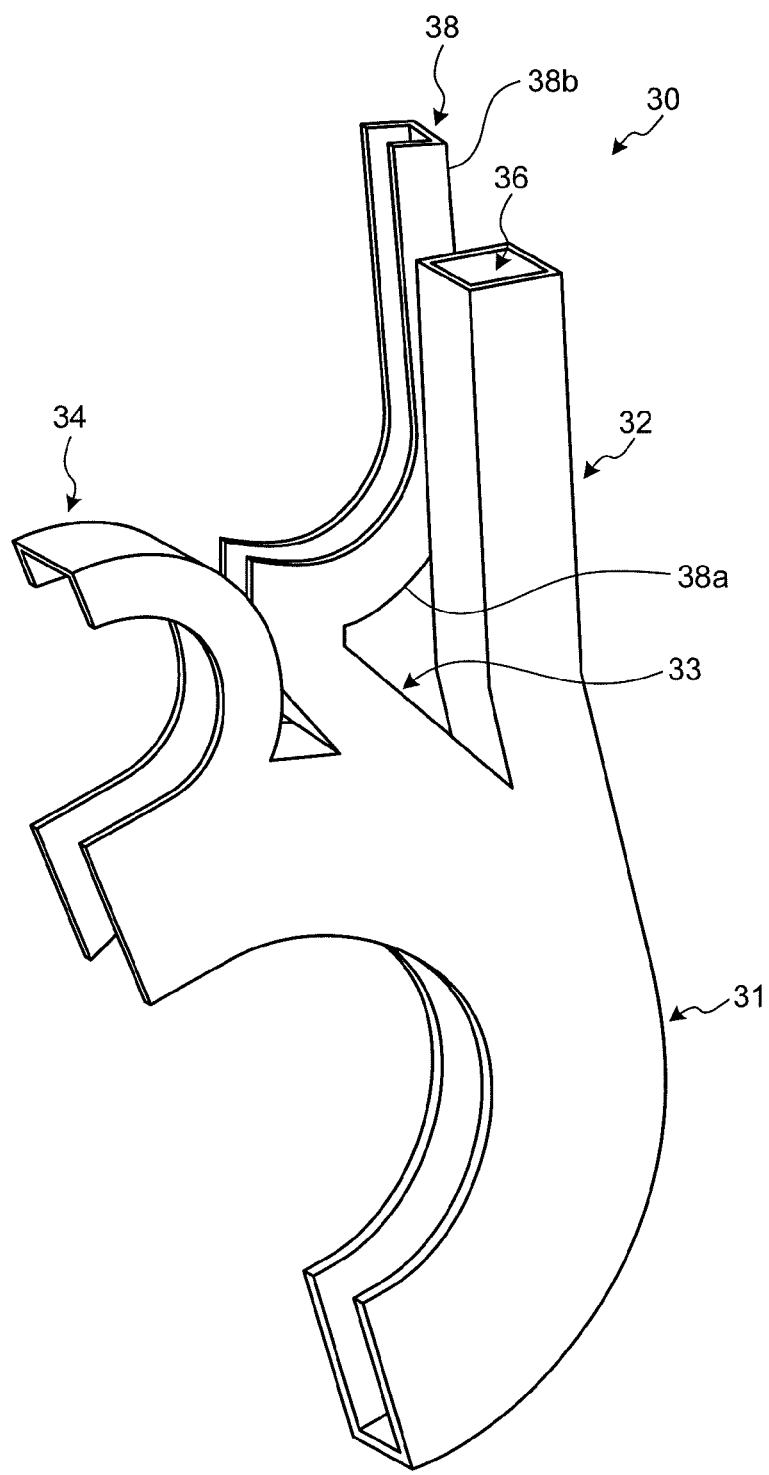
FIG. 11 is a perspective view of the passage member according to the second embodiment.

FIG. 7 is a front view illustrating the schematic structure of the power transmission device 1 according to the second embodiment, FIG. 8 is a cross-sectional view of the power transmission device 1 according to the second embodiment, FIG. 9 is a front view of a passage member according to the second embodiment, FIG. 10 is a side view of the passage member according to the second embodiment, and FIG. 11 is a perspective view of the passage member according to the second embodiment.

A passage member 30 of this embodiment includes a first component part 31, a second component part 32, a third component part 33, and a fourth component part 34. The first component part 31 and the fourth component part 34 may be the same as the first component part 11 and the fourth component part 14 of the first embodiment, respectively. The first component part 31 forms the outer peripheral flow passage 15 between the outer periphery of the differential ring gear 7 and itself. The second component part 32 forms a first passage 36. The first passage 36 is connected to the outer peripheral flow passage 15, and guides lubricating oil, which is sent by the rotation of the differential ring gear 7, to the oil receiving portion 8 from the outer peripheral flow passage 15. The second component part 32 extends toward the inlet 81 of the oil receiving portion 8 from the outer peripheral portion of the first component part 31 in the vertical direction. The lubricating oil of the oil receiving portion 8 is supplied to the first motor generator 25 and lubricates and cools the first motor generator 25.

The third component part 33 forms a second passage 37. The second passage 37 is connected to the outer peripheral flow passage 15, and guides the lubricating oil, which is sent by the rotation of the differential ring gear 7, to a scraper gear 26 from the outer peripheral flow passage 15. The scraper gear 26 is a gear that is rotated integrally with the MG2 reduction gear 6 as illustrated in FIG. 8. The scraper gear 26 is disposed between the MG2 reduction gear 6 and the second motor generator 20. The outer diameter of the scraper gear 26 is larger than the outer diameter of the MG2 reduction gear 6. Accordingly, at the same vehicle speed, the capacity for sending lubricating oil by the rotation of the scraper gear 26 is higher than the capacity for sending lubricating oil by the rotation of the MG2 reduction gear 6.

As illustrated in FIGS. 7 and 8, the third component part 33 includes a guide portion 38. The guide portion 38 guides the lubricating oil, which is sent by the rotation of the scraper gear 26, to an upper oil receiving portion 27. The upper oil receiving portion 27 is disposed above the oil receiving portion 8 in the vertical direction. The position of the upper oil receiving portion 27 in the vertical direction is based on the position of the top of the second motor generator 20. The lubricating oil of the upper oil receiving portion 27 is supplied to the top of the second motor generator 20, and lubricates and cools the second motor generator 20. In the lubricating oil supply device 1-2 of the power transmission device of this embodiment, the upper oil receiving portion 27 functions as a first oil receiving portion and the oil receiving portion 8 functions as a second oil receiving portion.

A lower portion 38*a* of the guide portion 38 extends in the rotation direction Y2 of the scraper gear 26 along the outer periphery of the scraper gear 26. An upper portion 38*b* of the guide portion 38 extends from the upper end of the lower portion 38*a* toward the upper oil receiving portion 27 in the vertical direction. The lower portion 38*a* of the guide portion 38 has a U-shaped cross-section, and faces an outer peripheral surface 26*a* and both side surfaces of the scraper gear 26. The upper portion 38*b* of the guide portion 38 has a U-shaped cross-section like the lower portion 38*a*, and guides the lubricating oil to the upper oil receiving portion 27 while suppressing the leakage of the lubricating oil in the axial direction by guarding the flow of the lubricating oil that is sent by the scraper gear 26.

An outlet of the second passage 37 is disposed closer to the front portion of the vehicle than the lower end of the scraper gear 26, that is, disposed on the rear side of the lowermost end of the scraper gear 26 in the rotation direction Y2. Accordingly, an oil pool is formed below the scraper gear 26, so that it is possible to increase the contact area between the lubricating oil flowing out of the second passage 37 and the scraper gear 26.

In this embodiment, lubricating oil is supplied to the first motor generator 25 through the first passage 36 and lubricating oil is supplied to the second motor generator 20 through the second passage 37. Accordingly, it is possible to appropriately supply lubricating oil according to the characteristics of the motor generators 20 and 25. FIG. 12 is a diagram illustrating the characteristics of the respective motor generators 20 and 25. The first motor generator 25 is disposed below the second motor generator 20 in the vertical direction.

Further, the first motor generator 25 often needs to be cooled at the time of high vehicle speed in which a load for power generation is increased. That is, the first motor generator 25 is a portion which is to be lubricated and to which lubricating oil needs to be supplied when vehicle speed is high. Meanwhile, the second motor generator 20 often needs to be cooled at the time of low vehicle speed in which the load of the second motor generator as a motor is increased. That is, the second motor generator 20 is a portion which is to be lubricated and to which lubricating oil needs to be supplied when vehicle speed is low.

The lubricating oil supply device 1-2 of this embodiment supplies lubricating oil to the second motor generator 20 by the scraper gear 26 and the second passage 37 having excellent capacity for sending lubricating oil to the upper side in the vertical direction when vehicle speed is low. Accordingly, it is possible to appropriately supply lubricating oil to the second motor generator 20 when vehicle speed is low. Further, the lubricating oil supply device 1-2 of this embodiment supplies lubricating oil to the first motor generator 25 by the first passage 36 having excellent capacity for sending lubricating oil to the upper side in the vertical direction when vehicle speed is high. Accordingly, it is possible to appropriately supply lubricating oil to the first motor generator 25 when vehicle speed is high.

[Third Embodiment]

A third embodiment will be described with reference to FIGS. 13 to 16. In the third embodiment, components having the same functions as the components described in the above-mentioned embodiments will be denoted by the same reference signs and the repeated description will be omitted. A lubricating oil supply device 1-3 of a power transmission device of this embodiment is different from the lubricating oil supply devices 1-1 and 1-2 of the power transmission devices of the respective embodiments in that the entire circumference of the drive pinion gear 5 is covered with a passage member. Accordingly, the lubricating oil supply device 1-3 of this embodiment can improve the capacity for supplying lubricating oil to the oil receiving portion 8 by suppressing the leakage of lubricating oil that has passed through the drive pinion gear 5.

Figure 13:
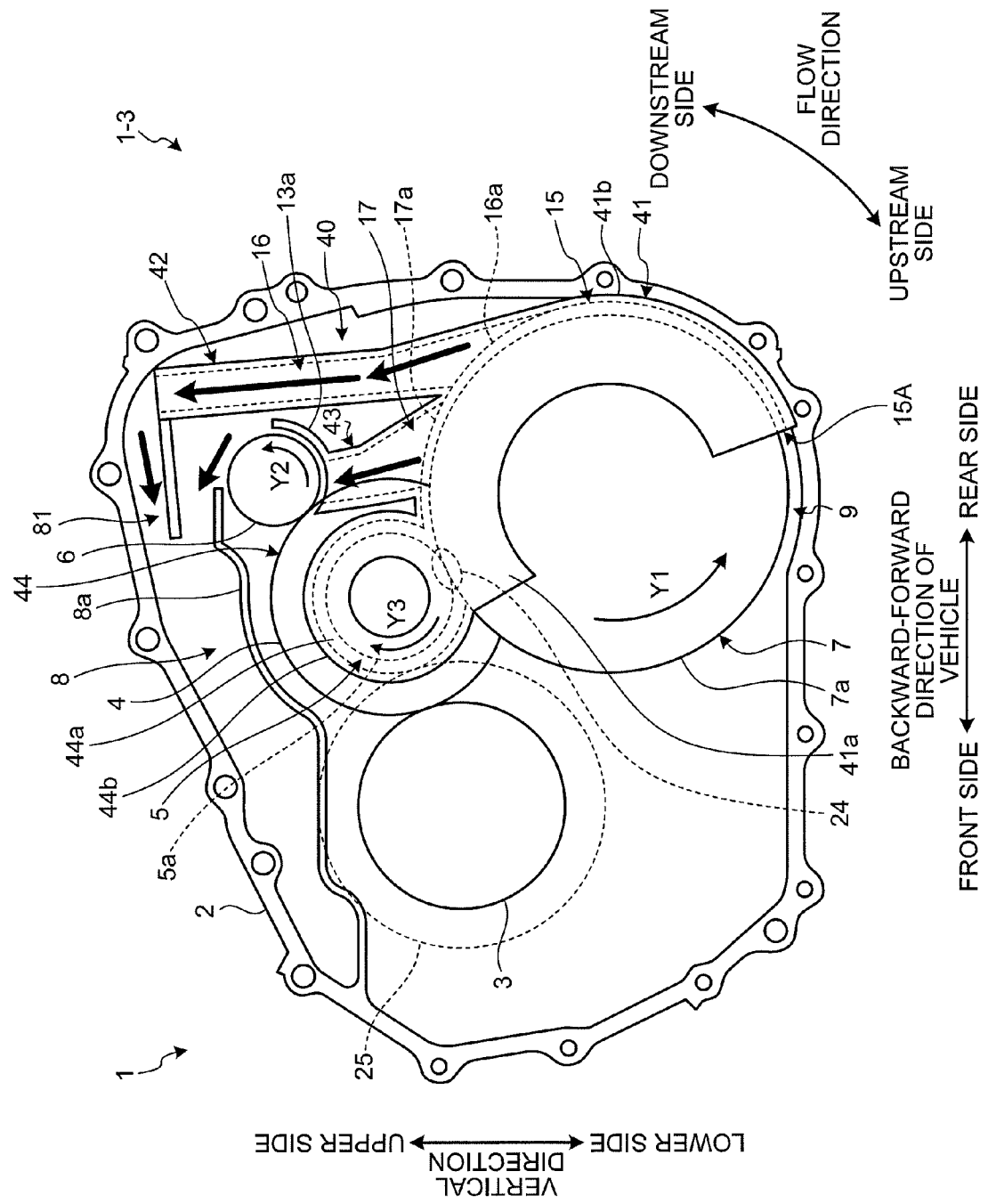
FIG. 13 is a front view illustrating the schematic structure of a power transmission device according to a third embodiment.
Figure 14:
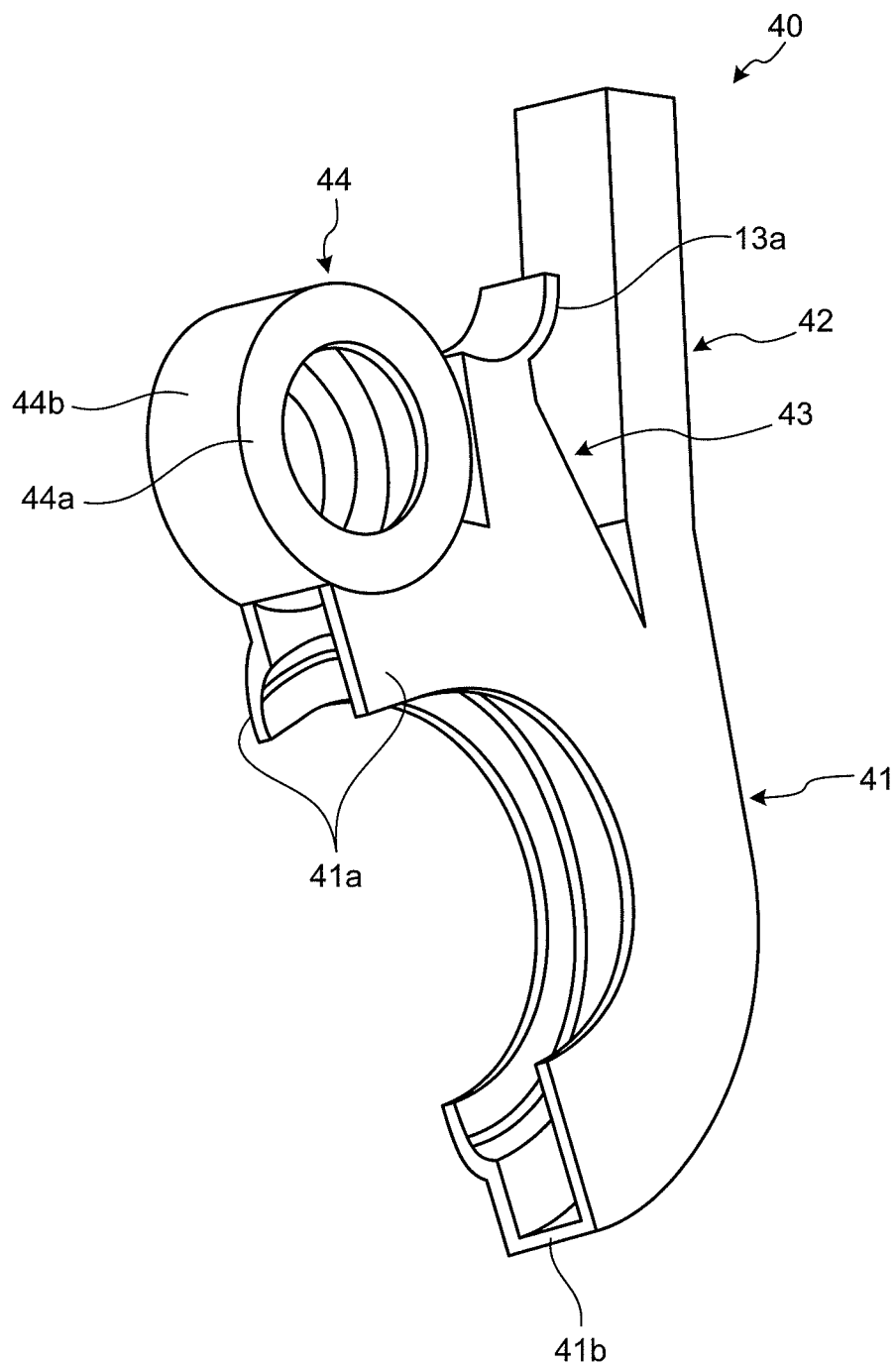
FIG. 14 is a perspective view of a passage member according to the third embodiment.
Figure 15:
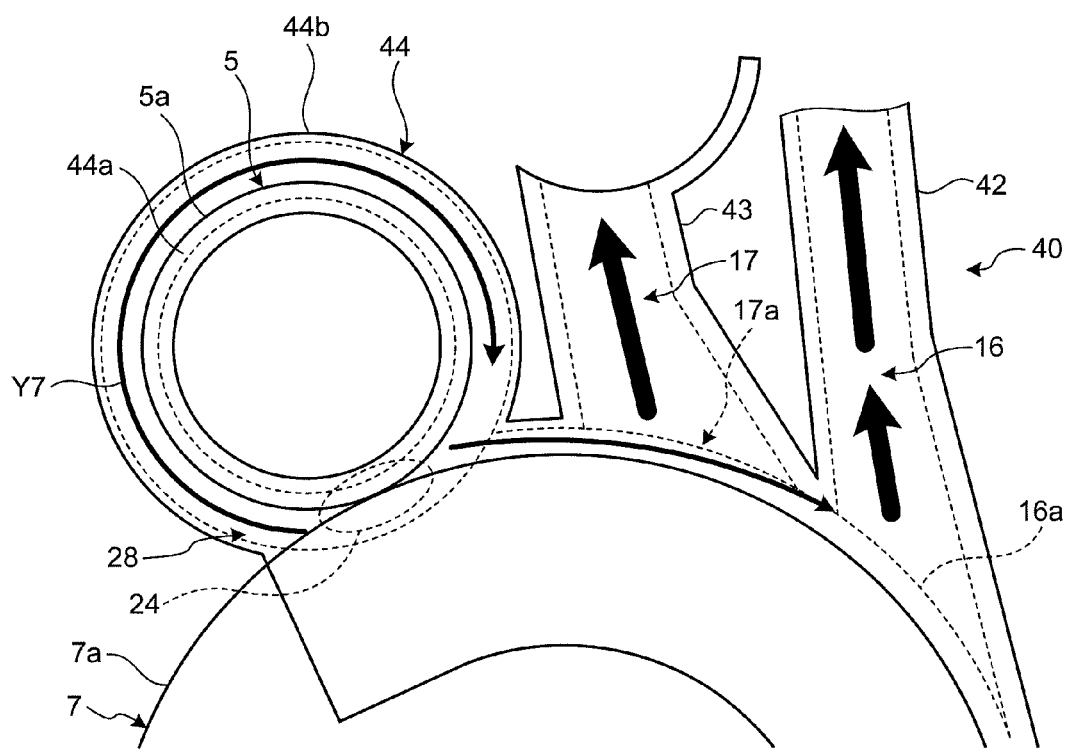
FIG. 15 is an explanatory diagram for illustrating the effect of a lubricating oil supply device of the power transmission device according to the third embodiment.
Figure 16:
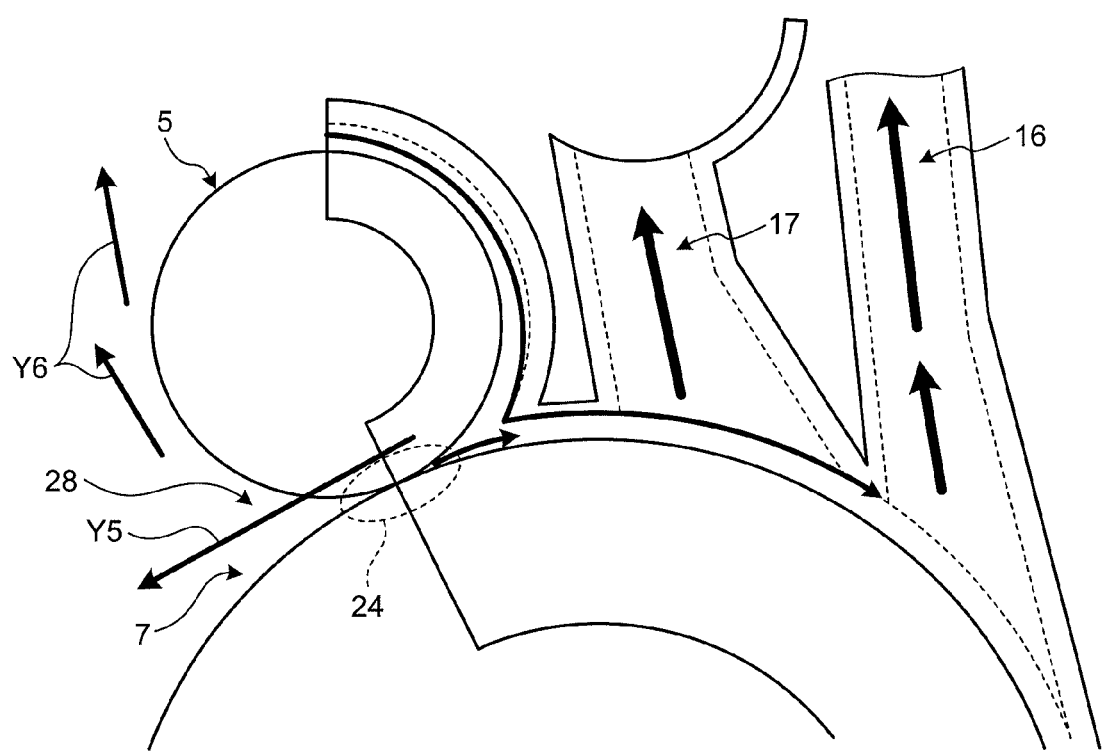
FIG. 16 is an explanatory diagram for illustrating the leakage of lubricating oil.

FIG. 13 is a front view illustrating the schematic structure of a power transmission device 1 according to the third embodiment, FIG. 14 is a perspective view of a passage member according to the third embodiment, FIG. 15 is an explanatory diagram illustrating the effect of the lubricating oil supply device 1-3 of the power transmission device according to the third embodiment, and FIG. 16 is an explanatory diagram illustrating the leakage of lubricating oil.

When a counter engagement-side space 28 is opened rather than the meshing portion 24 between the drive pinion gear 5 and the differential ring gear 7 as illustrated in FIG. 16, leakage from the tips of teeth of a gear or leakage from side surfaces of a gear occurs. For example, when the counter engagement-side space 28 is opened rather than the meshing portion 24, lubricating oil adhering to the side surfaces of the drive pinion gear 5, such as lubricating oil extruded from the meshing portion 24 in the axial direction, leaks from side surfaces of the gears 5 and 7 as illustrated by an arrow Y5. Further, when the counter engagement-side space 28 is opened, the lubricating oil adhering to the drive pinion gear 5 is separated from the tips of teeth of the drive pinion gear 5 and the leakage of the lubricating oil from the tips of teeth of the gear occurs as illustrated by arrows Y6. When the leakage from side surfaces of the gear or the leakage from the tips of teeth of the gear occurs, the flow rate of lubricating oil flowing into the first passage 16 and the second passage 17 is reduced to that extent.

A passage member 40 of this embodiment integrally covers the entire outer periphery of the drive pinion gear 5, which includes a meshing range meshing with the differential ring gear 7, and the outer periphery of the differential ring gear 7. Accordingly, the leakage of lubricating oil, which is sent by the differential ring gear 7, from the side surfaces of the gears or the leakage of the lubricating oil from the tips of teeth of the gear is suppressed, so that it is possible to improve the capacity for supplying lubricating oil to the oil receiving portion 8.

As illustrated in FIGS. 13 and 14, the passage member 40 includes a first component part 41, a second component part 42, a third component part 43, and a fourth component part 44. The first component part 41, the second component part 42, and the third component part 43 may be the same as, for example, the first component part 11, the second component part 12, and the third component part 13 of the first embodiment.

Like the first component part 11 of the first embodiment, the first component part 41 includes a pair of side wall portions 41a and a curved surface portion 41b and forms the outer peripheral flow passage 15 between the outer periphery of the differential ring gear 7 and itself.

The fourth component part 44 has an annular shape when seen in the axial direction, and covers the entire outer periphery of the drive pinion gear 5. The fourth component part 44 includes a pair of side wall portions 44a and a curved surface portion 44b. The side wall portions 44a have a substantially annular shape, and face each other in the axial direction with the drive pinion gear 5 interposed therebetween. The curved surface portion 44b is formed in the shape of a cylinder facing the outer peripheral surface 5a of the drive pinion gear 5, and a portion of the curved surface portion 44b corresponding to the meshing portion 24 is opened toward the differential ring gear 7. Outer end portions of the pair of side wall portions 44a and 44a in the radial direction of the drive pinion gear 5 are connected to each other in the axial direction by the curved surface portion 44b. That is, the fourth component part 44 covers the outer periphery of the drive pinion gear 5 from both sides in the axial direction and from the outside in the radial direction of the drive pinion gear 5.

The side wall portions 41a of the first component part 41 and the side wall portions 44a of the fourth component part 44 continue to each other in the radial direction, and the side wall portions 41a and 44a cover the side surfaces of the differential ring gear 7 and the side surfaces of the drive pinion gear 5, which include the meshing portion 24, as an integrated wall portion. Further, the curved surface portion 44b is connected to the curved surface portion 41b of the first component part 41, and covers the entire outer peripheral surface 5a of the drive pinion gear 5 and the outer peripheral surface 7a of the differential ring gear 7 together with the curved surface portion 41b. In other words, since the passage member 40 integrally covers the entire outer periphery of the drive pinion gear 5, the meshing portion 24, and the outer periphery of the differential ring gear 7, the passage member 40 closes the counter engagement-side space 28 with respect to the meshing portion 24.

Accordingly, the passage member 40 of this embodiment can suppress the leakage of lubricating oil from the tips of teeth of the drive pinion gear 5 or the leakage of lubricating oil from the side surfaces of the gears 5 and 7. The fourth component part 14 guides the lubricating oil, which is extruded to the counter engagement-side space 28 from the meshing portion 24, to the upstream side of the meshing portion 24 in the flow direction of the outer peripheral flow passage 15 by the rotation of the drive pinion gear 5 as illustrated in FIG. 15 by an arrow Y7. Accordingly, it is possible to increase a flow rate or pressure that makes lubricating oil return toward the first and second inlets 16a and 17a from the meshing portion 24. Therefore, the lubricating oil supply device 1-3 of the power transmission device of this embodiment can improve the capacity for sending the lubricating oil, which is sent by the rotation of the differential ring gear 7, to the upper side in the vertical direction through the first passage 16 and the second passage 17.

[Fourth Embodiment]

Figure 17:
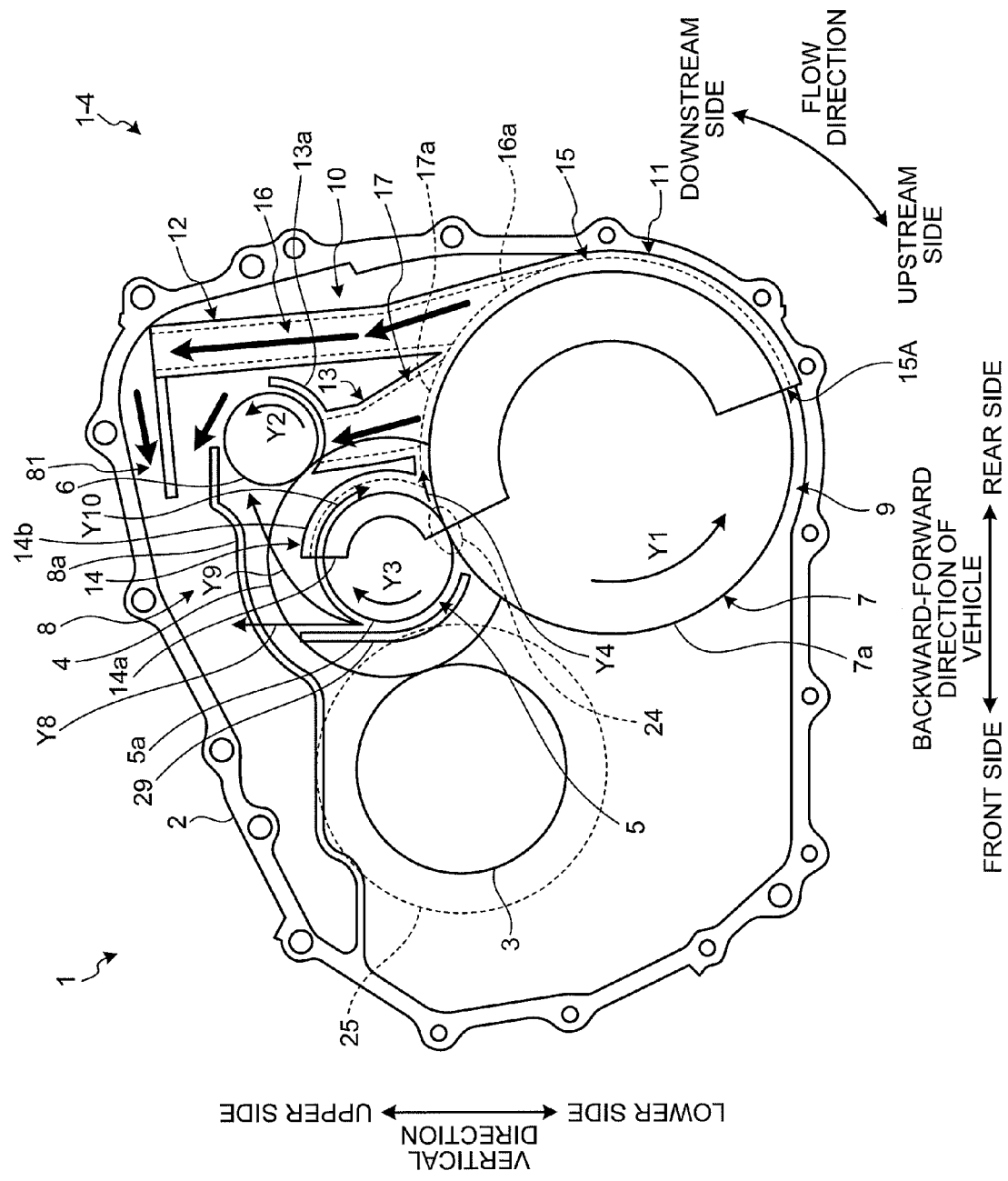
FIG. 17 is a front view illustrating the schematic structure of a power transmission device according to a fourth embodiment.

A fourth embodiment will be described with reference to FIG. 17. In the fourth embodiment, components having the same functions as the components described in the above-mentioned embodiments will be denoted by the same reference signs and the repeated description will be omitted. FIG. 17 is a front view illustrating the schematic structure of a power transmission device according to the fourth embodiment.

A lubricating oil supply device 1-4 of a power transmission device of this embodiment is different from the lubricating oil supply devices 1-1, 1-2, and 1-3 of the power transmission devices of the respective embodiments in that a guide member 29 guiding the lubricating oil, which is sent by the rotation of the drive pinion gear 5, to the upper side in the vertical direction is provided. Accordingly, it is possible to improve the capacity for supplying the lubricating oil, which is sent by the rotation of the differential ring gear 7, to the oil receiving portion 8. Here, an example in which the guide member 29 is applied to the lubricating oil supply device 1-1 of the power transmission device of the first embodiment will be described.

As illustrated in FIG. 17, the lubricating oil supply device 1-4 of the power transmission device includes the guide member 29. The guide member 29 faces the outer peripheral surface 5a of the drive pinion gear 5, and forms a guide passage for lubricating oil between the outer peripheral surface 5a and itself. The guide member 29 extends along the outer peripheral surface 5a from the vicinity of the meshing portion 24, which is formed between the differential ring gear 7 and the drive pinion gear 5, in a rotation direction Y3 of the drive pinion gear 5, and then extends linearly upward in the vertical direction. The guide member 29 faces the counter engagement-side outer peripheral surface 5a of the drive pinion gear 5 rather than the meshing portion 24.

The lubricating oil that is to fall from the side surfaces of the drive pinion gear 5 and the lubricating oil that adheres to the tips of teeth of the drive pinion gear 5 are guided by the guide member 29 and are guided upward in the vertical direction by the rotation of the drive pinion gear 5. Accordingly, it is possible to efficiently sent lubricating oil to the upper side in the vertical direction by suppressing the loss of the lubricating oil that is sent to the outer peripheral flow passage 15 by the rotation of the differential ring gear 7. For example, as illustrated by an arrow Y8, the lubricating oil sent by the drive pinion gear 5 may be directly guided to the oil receiving portion 8 by the guide member 29. In this case, the oil receiving portion 8 may be provided with an inlet so that the lubricating oil sent from the drive pinion gear 5 can be received. The diameter of the drive pinion gear 5 is smaller than the diameter of the differential ring gear 7, and the drive pinion gear 5 is rotated at a speed that is relatively higher than the rotational speed of the differential ring gear 7. Accordingly, even though vehicle speed is low, the drive pinion gear 5 can allow lubricating oil to reach a high position present in the case 2 in the vertical direction.

Further, as illustrated by an arrow Y9, the lubricating oil, which is sent by the rotation of the drive pinion gear 5, may be guided to the MG2 reduction gear 6 by the guide member 29. In this case, it is possible to guide lubricating oil to the oil receiving portion 8 through the MG2 reduction gear 6.

Furthermore, at least a part of the lubricating oil, which is guided to the upper side in the vertical direction by the guide member 29, flows into the fourth component part 14 as illustrated by an arrow Y10 while adhering to the drive pinion gear 5. Accordingly, oil pressure in the outer peripheral flow passage 15 rises, so that the capacity for supplying lubricating oil to the oil receiving portion 8 through the first passage 16 and the second passage 17 is increased.

[Fifth Embodiment]

Figure 18:
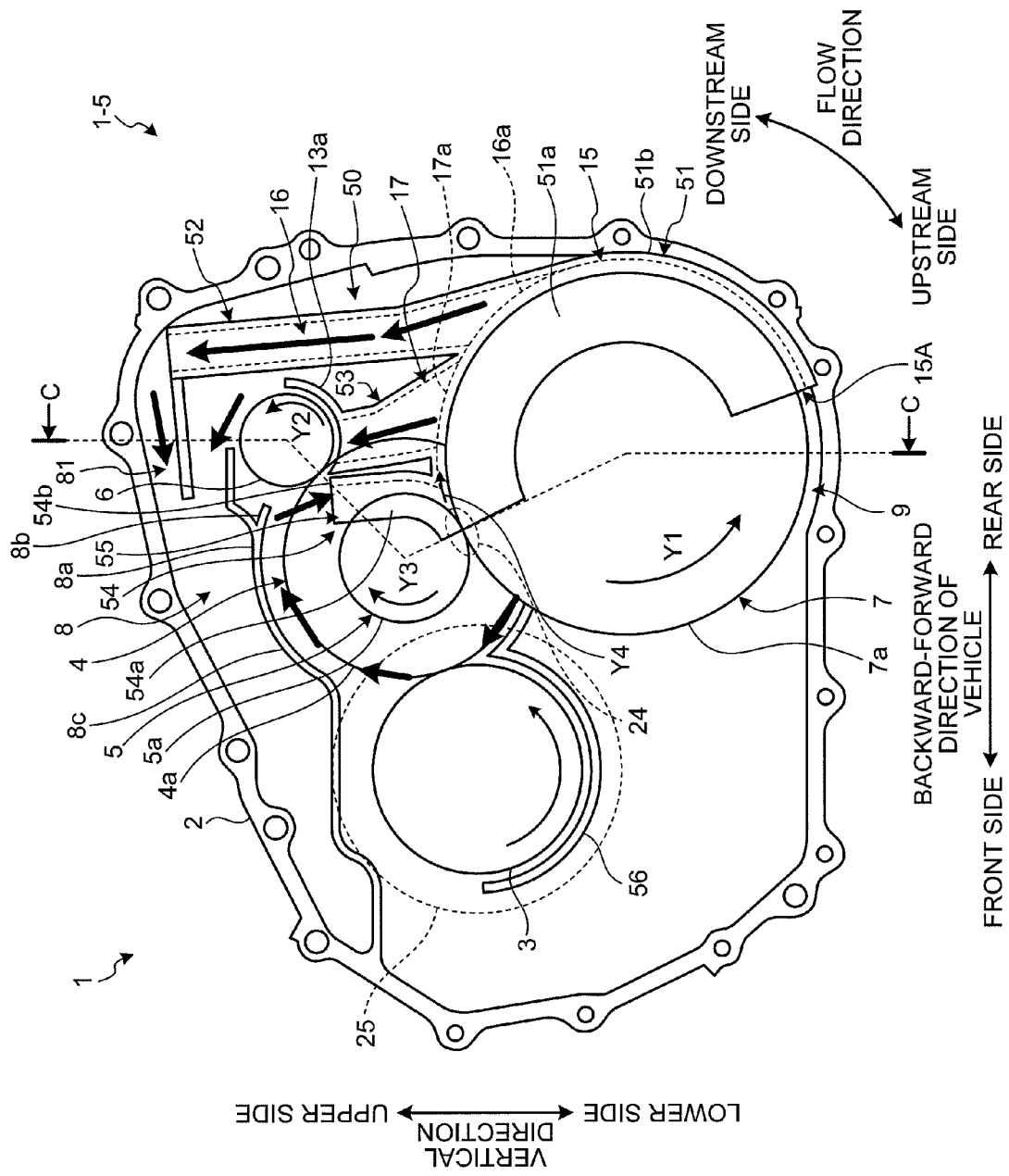
FIG. 18 is a front view illustrating the schematic structure of a power transmission device according to a fifth embodiment.
Figure 19:
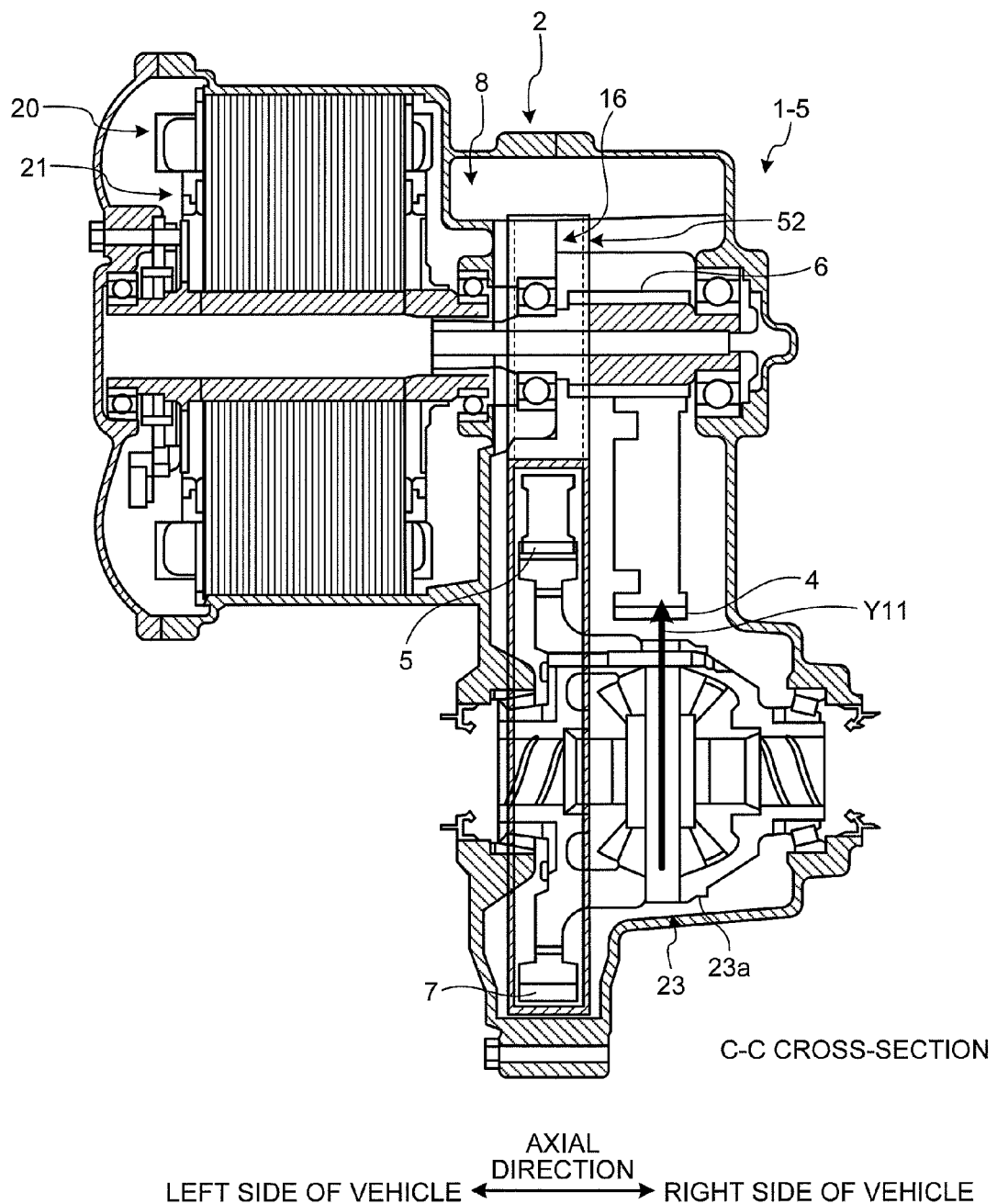
FIG. 19 is a cross-sectional view of the power transmission device according to the fifth embodiment.

A fifth embodiment will be described with reference to FIG. 18. In the fifth embodiment, components having the same functions as the components described in the above-mentioned embodiments will be denoted by the same reference signs and the repeated description will be omitted. A lubricating oil supply device 1-5 of a power transmission device of this embodiment is different from the lubricating oil supply devices 1-1, 1-2, 1-3, and 1-4 of the power transmission devices of the respective embodiments in that a guide passage 55 guiding lubricating oil, which falls from the upper side in the vertical direction, to the meshing portion 24 between the differential ring gear 7 and the drive pinion gear 5 is provided. Since lubricating oil is actively guided to the meshing portion 24 from the outside of a passage member 50, the wall of lubricating oil is strengthened against the lubricating oil to be directed to the meshing portion 24 from the second inlet 17a. FIG. 18 is a front view illustrating the schematic structure of the power transmission device according to the fifth embodiment, and FIG. 19 is a cross-sectional view of the power transmission device according to the fifth embodiment.

As illustrated in FIG. 18, the passage member 50 includes a first component part 51, a second component part 52, a third component part 53, and a fourth component part 54. The first component part 51, the second component part 52, and the third component part 53 may be the same as the first component part 11, the second component part 12, and the third component part 13 of the first embodiment, respectively.

Like the first component part 11 of the first embodiment, the first component part 51 includes a pair of side wall portions 51a and a curved surface portion 51b and forms the outer peripheral flow passage 15 between the outer periphery of the differential ring gear 7 and itself.

The fourth component part 54 includes a pair of side wall portions 54a and a connecting wall portion 54b. The side wall portions 54a and 54a face each other in the axial direction with the drive pinion gear 5 interposed therebetween. The connecting wall portion 54b is a wall portion that faces the outer peripheral surface 5a of the drive pinion gear 5. The side wall portion 54a is formed continuously with the side wall portion 51a so as to be flush with the side wall portion 51a of the first component part 51. The side wall portions 51a and 54a cover the outer periphery of the differential ring gear 7, the outer periphery of the drive pinion gear 5, and the meshing portion 24 from both sides in the axial direction.

Outer end portions of the side wall portions 54a and 54a in the radial direction of the drive pinion gear 5 are connected to each other in the axial direction by the connecting wall portion 54b. The connecting wall portion 54b faces a portion of the outer peripheral surface 5a closer to the engagement side than the meshing portion 24, that is, a portion of the outer peripheral flow passage 15 positioned on the upstream side of the meshing portion 24. The connecting wall portion 54b is connected to the curved surface portion 51b of the first component part 51, and closes the engagement side with respect to the meshing portion 24 together with the curved surface portion 51b. In this way, the passage member 50 integrally covers the outer periphery of the differential ring gear 7, the outer periphery of the drive pinion gear 5, and the meshing portion 24.

Like the fourth component part 14 of the first embodiment, a lower portion of the fourth component part 54 in the vertical direction extends along the outer periphery of the drive pinion gear 5. Meanwhile, an upper portion of the fourth component part 54 in the vertical direction extends in the vertical direction. In this embodiment, a portion of the fourth component part 54, which is positioned above the position of the center of rotation of the drive pinion gear 5, extends linearly in the vertical direction.

The guide passage 55 is formed between the fourth component part 54 and the outer periphery of the drive pinion gear 5. A gap between the connecting wall portion 54b of the fourth component part 54 and the outer peripheral surface 5a of the drive pinion gear 5 becomes larger toward the upper side in the vertical direction. That is, the guide passage 55 is opened upward so as to receive the lubricating oil that falls from the upper side in the vertical direction. Accordingly, the guide passage 55 can guide the lubricating oil, which falls from the upper side in the vertical direction, to the meshing portion 24.

The lubricating oil supply device 1-5 of this embodiment has a guide structure in which lubricating oil scraped off by the rotation of the counter driven gear 4 falls into the guide passage 55. Specifically, the rib 8a of the oil receiving portion 8 includes a guide portion 8b. The guide portion 8b guides lubricating oil, which is scraped off by the rotation of the counter driven gear 4 and adheres to the rib 8a, to the upper side of the guide passage 55 in the vertical direction and makes the lubricating oil fall into the guide passage 55. The rib 8a includes a curved surface portion 8c that extends along an outer peripheral surface 4a of the counter driven gear 4. The guide portion 8b is a front end portion of the curved surface portion 8c in the rotation direction Y3 of the counter driven gear 4. The guide portion 8b is inclined downward toward the front side in the rotation direction Y3. The tip of the guide portion 8b is positioned immediately above the opening of the guide passage 55. Accordingly, the lubricating oil, which is sent by the rotation of the counter driven gear 4, falls from the tip of the guide portion 8b and flows into the guide passage 55.

Further, the case 2 includes a rib 56 that is disposed below the counter driven gear 4 in the vertical direction. The rib 56 faces the lower portion of the outer peripheral surface 4a of the counter driven gear 4, and extends along the outer peripheral surface 4a. As illustrated in FIG. 19 by an arrow Y11, the lubricating oil, which adheres to a differential gear case 23a of the differential mechanism 23, is sent by the rotation of the differential gear case 23a and adheres to the counter driven gear 4. The lubricating oil adhering to the counter driven gear 4 is sent to the rib 8a, which is positioned on the upper side in the vertical direction, by the rotation of the counter driven gear 4, is guided by the guide portion 8b, and falls into the guide passage 55. The rib 56 illustrated in FIG. 18 guards the lubricating oil, which adheres to the counter driven gear 4, from below and suppresses the falling of the lubricating oil.

Furthermore, the rib 56 guards the lower portion of the counter drive gear 3. The rib 56 has a W shape, and guards the lower portions of the counter driven gear 4 and the counter drive gear 3 in the vertical direction, respectively. Accordingly, the lubricating oil adhering to the counter drive gear 3 is sent between the counter drive gear 3 and the rib 56 and is sent to the meshing portion between the counter drive gear 3 and the counter driven gear 4. Therefore, the rib 56 increases the amount of lubricating oil to the guide passage 55 by increasing the amount of lubricating oil that is to be scraped off by the counter driven gear 4.

Meanwhile, a guide member, which guides lubricating oil having lubricated the respective portions of the power transmission device 1 to the upper side of the guide passage 55 other than the lubricating oil sent by the rotation of the counter driven gear 4 and makes the lubricating oil fall into the guide passage 55, may be provided. If the lubricating oil having been subjected to lubrication is guided to the guide passage 55, it is possible to efficiently circulate lubricating oil to the oil receiving portion 8 as compared to a case in which lubricating oil falls into the storage portion 9 and is scraped off again by the differential ring gear 7.

[Modification of Each Embodiment]

Figure 20:
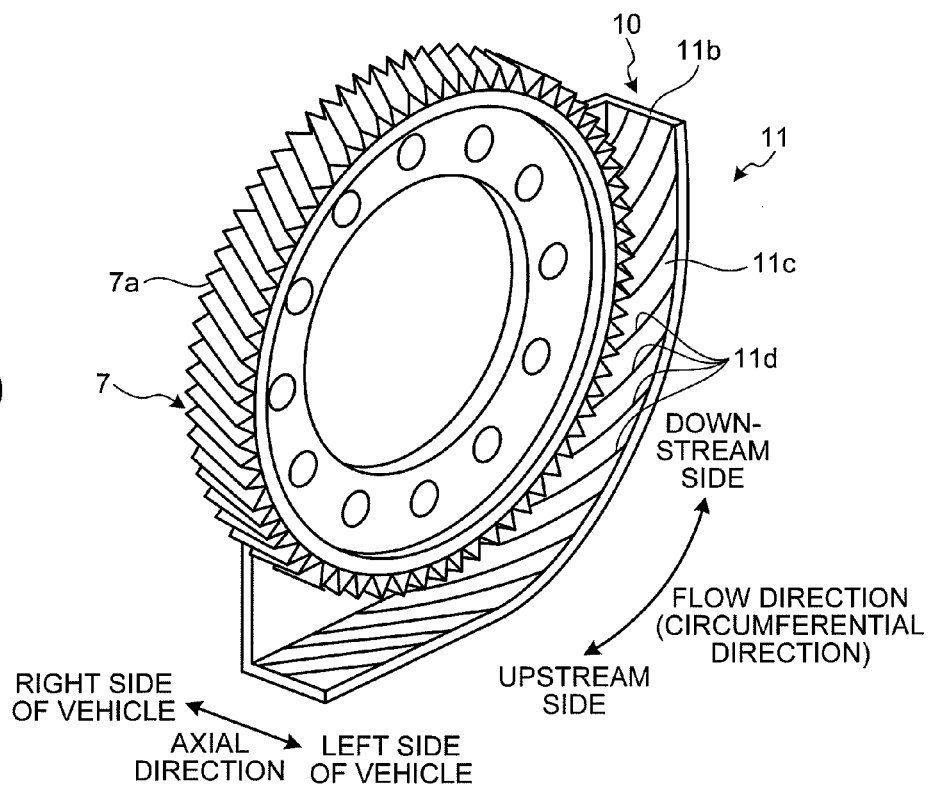
FIG. 20 is a perspective view illustrating main portions of a passage member according to a modification.
Figure 21:
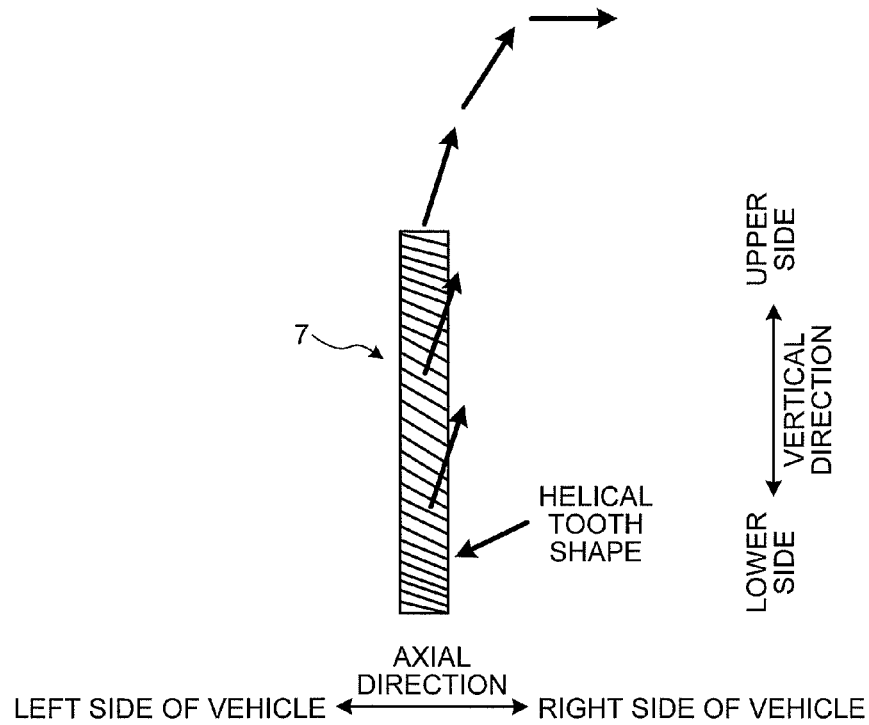
FIG. 21 is a diagram illustrating the advancing direction of lubricating oil that is sent by a differential ring gear.

A modification of each embodiment will be described. FIG. 20 is a perspective view illustrating main portions of the passage member 10 according to this modification, and FIG. 21 is a diagram illustrating the advancing direction of lubricating oil that is sent by a differential ring gear. In this modification, patterns opposite to helical teeth of a gear are formed on a guide surface that guides the scraping performed by the gear. Accordingly, it is possible to improve scraping efficiency by suppressing the oblique advance of the lubricating oil that is sent by the rotation of the gear. A case in which patterns are formed on the guide surface of the passage member 10 of the first embodiment will be exemplified in this modification.

As illustrated in FIG. 21, a differential ring gear 7 is a helical gear. The tooth trace of the differential ring gear 7 is inclined with respect to both the axial direction and the circumferential direction. Accordingly, the lubricating oil, which is sent by the rotation of the differential ring gear 7, is splashed in a direction (axial direction) inclined to the circumferential direction. As a result, there is a concern that a loss is generated in the height to which lubricating oil can be scraped by a force of the rotation of the differential ring gear 7.

In this modification, as illustrated in FIG. 20, patterns 11d are formed on a guide surface 11c of the curved surface portion 11b of the passage member 10, that is, the surface of the curved surface portion lib of the passage member 10 facing the outer peripheral surface 7a of the differential ring gear 7. The patterns 11d are formed in the shape of lines parallel to each other, and a plurality of patterns 11d are formed on the guide surface 11c at a predetermined interval.

The pattern 11d may be formed in the shape of, for example, a protrusion protruding inward from the guide surface 11c in the radial direction or a groove recessed from the guide surface toward the outside in the radial direction. The pattern 11d has the shape of an oblique line that is inclined with respect to the circumferential direction. The inclination direction of the pattern 11d is a direction that is opposite to an inclination direction in which the lubricating oil sent by the differential ring gear 7 is splashed. That is, if the tooth trace of the differential ring gear 7 corresponds to an inclination direction that is directed downward in the vertical direction toward the right side of the vehicle in an area facing the guide surface 11c, the inclination direction of the pattern 11d facing this tooth trace is inclined downward in the vertical direction toward the right side of the vehicle.

Accordingly, when lubricating oil is to be splashed to one side in the axial direction, for example, the right side of the vehicle by the rotation of the differential ring gear 7, the lubricating oil receives a force that is directed to the left side of the vehicle by the patterns 11d. Accordingly, the splashing of the lubricating oil to one side in the axial direction is suppressed, so that the lubricating oil is guided upward in the vertical direction.

Since the patterns 11d are formed on the guide surface 11c as described above, the lubricating oil sent by the differential ring gear 7 is guided upward in the vertical direction. Accordingly, according to this modification, it is possible to improve the capacity for supplying the lubricating oil, which is sent by the rotation of the differential ring gear 7, to the oil receiving portion 8.

The contents, which are disclosed in the respective embodiments and the modification, may be appropriately combined with each other when being embodied.

REFERENCE SIGNS LIST 1-1, 1-2, 1-3, 1-4, 1-5 lubricating oil supply device of power transmission device
1 power transmission device
5 drive pinion gear (third rotary member)
6 MG2 reduction gear (second rotary member)
7 differential ring gear (first rotary member)
8 oil receiving portion
9 storage portion
10, 30, 40, 50 passage member
15 outer peripheral flow passage
16 first passage
16a first inlet
17 second passage
17a second inlet

The invention claimed is:

1. A lubricating oil supply device of a power transmission device comprising:
a storage portion configured to store lubricating oil;
a first rotary member configured to be connected to a wheel of a vehicle and rotated in conjunction with a rotation of the wheel to send the lubricating oil of the storage portion;
a second rotary member configured to be disposed above the first rotary member in a vertical direction and connected to the wheel;
an oil receiving portion configured to be disposed above the first rotary member and the second rotary member in the vertical direction;
a first passage configured to guide the lubricating oil, which is sent by the rotation of the first rotary member, to the oil receiving portion;
a second passage configured to guide the lubricating oil, which is sent by the rotation of the first rotary member, to the second rotary member;
an outer peripheral flow passage configured to extend along an outer periphery of the first rotary member and guide the lubricating oil, which is sent by the rotation of the first rotary member, to the upper side in the vertical direction; wherein
the first passage and the second passage are connected to the outer peripheral flow passage, respectively,
a second inlet that is an inlet to the second passage from the outer peripheral flow passage is positioned on the outer peripheral flow passage on the downstream side of a first inlet that is an inlet to the first passage from the outer peripheral flow passage, in a flow direction of lubricating oil,
the cross-sectional area of the outer peripheral flow passage on the downstream side of the second inlet in the flow direction is smaller than the cross-sectional area of the outer peripheral flow passage on the upstream side of the second inlet in the flow direction, and
the second rotary member is rotated in conjunction with the rotation of the wheel to send the lubricating oil, which is sent through the second passage, to the upper side in the vertical direction.

2. The lubricating oil supply device of a power transmission device according to claim 1, further comprising:
a guide portion configured to guide the lubricating oil, which is sent by the second rotary member, to the oil receiving portion.

3. The lubricating oil supply device of a power transmission device according to claim 1, wherein
the cross-sectional area of the outer peripheral flow passage between the first inlet and the second inlet is smaller than the cross-sectional area of the outer peripheral flow passage on the upstream side of the first inlet in the flow direction.

4. The lubricating oil supply device of a power transmission device according to claim 3, further comprising:
a guide portion configured to guide the lubricating oil, which is sent by the second rotary member, to the oil receiving portion.

5. The lubricating oil supply device of a power transmission device according to claim 4, wherein
the oil receiving portion includes a first oil receiving portion connected to a portion to be lubricated and to which lubricating oil needs to be supplied at the time vehicle speed is low, and a second oil receiving portion connected to a portion to be lubricated and to which lubricating oil needs to be supplied at the time vehicle speed is high,
the first passage guides the lubricating oil, which is sent by the rotation of the first rotary member, to the second oil receiving portion, and
the guide portion guides the lubricating oil, which is sent by the second rotary member, to the first oil receiving portion.

6. A lubricating oil supply device of a power transmission device comprising:
a storage portion configured to store lubricating oil;
a first rotary member configured to be connected to a wheel of a vehicle and rotated in conjunction with a rotation of the wheel to send the lubricating oil of the storage portion;
a second rotary member configured to be disposed above the first rotary member in a vertical direction and connected to the wheel;
an oil receiving portion configured to be disposed above the first rotary member and the second rotary member in the vertical direction;
a first passage configured to guide the lubricating oil, which is sent by the rotation of the first rotary member, to the oil receiving portion;
a second passage configured to guide the lubricating oil, which is sent by the rotation of the first rotary member, to the second rotary member;
a third rotary member configured to mesh with the first rotary member; and
a passage member configured to cover an outer periphery of the first rotary member and an outer periphery of the third rotary member, wherein
the passage member forms an outer peripheral flow passage between the outer periphery of the first rotary member and the passage member, the outer peripheral flow passage guides the lubricating oil sent by the rotation of the first rotary member to the upper side in the vertical direction,
the first passage and the second passage are connected to the outer peripheral flow passage on the upstream side of the third rotary member in the flow direction of lubricating oil,
the passage member integrally covers the entire outer periphery of the third rotary member, which includes a meshing range meshing with the first rotary member, and the outer periphery of the first rotary member, and
the second rotary member is rotated in conjunction with the rotation of the wheel to send the lubricating oil, which is sent through the second passage, to the upper side in the vertical direction.

7. A lubricating oil supply device of a power transmission device comprising:
a storage portion configured to store lubricating oil; a first rotary member configured to be connected to a wheel of a vehicle and rotated in conjunction with a rotation of the wheel to send the lubricating oil of the storage portion;
a second rotary member configured to be disposed above the first rotary member in a vertical direction and connected to the wheel;
an oil receiving portion configured to be disposed above the first rotary member and the second rotary member in the vertical direction;
a first passage configured to guide the lubricating oil, which is sent by the rotation of the first rotary member, to the oil receiving portion;
a second passage configured to guide the lubricating oil, which is sent by the rotation of the first rotary member, to the second rotary member;
a third rotary member configured to mesh with the first rotary member; and
a guide member configured to face- the outer peripheral surface of the third rotary member and guide lubricating oil sent by the rotation of the third rotary member to the upper side in the vertical direction, wherein
the second rotary member is rotated in conjunction with the rotation of the wheel to send the lubricating oil, which is sent through the second passage, to the upper side in the vertical direction.

8. A lubricating oil supply device of a power transmission device comprising:
a storage portion configured to store lubricating oil;
a first rotary member configured to be connected to a wheel of a vehicle and rotated in conjunction with a rotation of the wheel to send the lubricating oil of the storage portion;
a second rotary member configured to be disposed above the first rotary member in a vertical direction and connected to the wheel;
an oil receiving portion configured to be disposed above the first rotary member and the second rotary member in the vertical direction;
a first passage configured to guide the lubricating oil, which is sent by the rotation of the first rotary member, to the oil receiving portion;
a second passage configured to guide the lubricating oil, which is sent by the rotation of the first rotary member, to the second rotary member;
a third rotary member configured to mesh with the first rotary member; and
a passage member configured to integrally cover an outer periphery of the first rotary member, an outer periphery of the third rotary member, and a meshing portion between the first rotary member and the third rotary member, wherein
the passage member forms an outer peripheral flow passage between the outer periphery of the first rotary member and the passage member, the outer peripheral flow passage guides the lubricating oil sent by the rotation of the first rotary member to the upper side in the vertical direction,
the first passage and the second passage are connected to the outer peripheral flow passage on the upstream side of the meshing portion in the flow direction of lubricating oil,
the passage member further forms a guide passage between the outer periphery of the third rotary member and the passage member,
the guide passage guides lubricating oil, which falls from the upper side in the vertical direction, to the meshing portion, and
the second rotary member is rotated in conjunction with the rotation of the wheel to send the lubricating oil, which is sent through the second passage, to the upper side in the vertical direction.

* * * * *